(12) United States Patent
Hurd

(10) Patent No.: US 10,872,466 B1
(45) Date of Patent: Dec. 22, 2020

(54) CREATING IMPROVED 3D MODELS FROM 2D DATA

(71) Applicant: Trimble Inc., Sunnyvale, CA (US)

(72) Inventor: Darrin Hurd, Christchurch (NZ)

(73) Assignee: Trimble Inc., Sunnyvale, CA (US)

(*) Notice: Subject to any disclaimer, the term of this patent is extended or adjusted under 35 U.S.C. 154(b) by 0 days.

(21) Appl. No.: 16/439,579

(22) Filed: Jun. 12, 2019

(51) Int. Cl.
 *G06T 17/05* (2011.01)
 *G06T 7/70* (2017.01)
 *G06T 7/521* (2017.01)

(52) U.S. Cl.
 CPC .............. *G06T 17/05* (2013.01); *G06T 7/521* (2017.01); *G06T 7/70* (2017.01)

(58) Field of Classification Search
 None
 See application file for complete search history.

(56) References Cited

U.S. PATENT DOCUMENTS

| 2009/0293012 A1* | 11/2009 | Alter | G06F 3/0346 715/810 |
| 2013/0182009 A1* | 7/2013 | Nielsen | G06Q 10/06 345/629 |
| 2017/0046877 A1* | 2/2017 | Hustad | G09G 5/003 |

FOREIGN PATENT DOCUMENTS

| KR | 10-1918486 B1 | 11/2018 |

OTHER PUBLICATIONS

Transcript and associated screen shots for YouTube video "Augmented Reality Underground Utilities", by Bentley® Applied Research, Bentley Systems, Inc., published on Jul. 20, 2013; (total length of video: 3:57), 28 pages. Downloaded Sep. 26, 2019 at https://www.youtube.com/watch?v=KS_5OHoHHuo.

Meehan, B., "NJ Utility on Forefront with New Mixed Reality Application," Jun. 14, 2017, Associated screen shots for article, 7 pages, downloaded Oct. 23, 2019 at, https://www.esri.com/about/newsroom/publications/wherenext/nj-utility-on-forefront-with-new-mixed-reality-application/.

Transcript and associated screen shots for YouTube videos found on "vGIS Locate Infrastructure Faster and Prevent Errors", by ESRI, 40 pages, downloaded on Sep. 26, 2019. https://www.vgis.io/esri-augmented-reality-gis-ar-for-utilities-municipalities-locate-and-municipal-service-companies/.

* cited by examiner

Primary Examiner — Edward Martello
(74) Attorney, Agent, or Firm — Kilpatrick Townsend & Stockton LLP

(57) ABSTRACT

Techniques for displaying underground assets using a portable electronic device. A camera image of a ground having a ground surface may be captured. A placement of a virtual pit in the camera image may be determined. A pit view comprising the virtual pit and a virtual representation of an underground asset, and a superimposed image comprising the camera image and the pit view may be generated. A top opening of the virtual pit may align with the ground surface in the camera image. A portion of the virtual representation of the underground asset may be shown inside the virtual pit and below the top opening of the virtual pit such that a distance between the top opening and the portion of the virtual representation of the underground asset inside the virtual pit may provide a visual indication of a depth of the underground asset relative to the ground surface.

20 Claims, 20 Drawing Sheets

CREATING IMPROVED 3D MODELS FROM 2D DATA

BACKGROUND

The recent growth of virtual reality (VR) and augmented reality (AR) technologies has been remarkable. In most implementations, VR and AR systems include devices that allow digitally reproduced images to be presented to a user in a manner wherein they seem to be, or may be perceived as, real. A VR scenario typically involves presentation of digital or virtual image information without transparency to other actual real-world visual input, whereas an AR scenario typically involves presentation of digital or virtual image information as an augmentation to visualization of the actual world around the user.

Global navigation satellite systems (GNSS) use wireless signals that are transmitted from medium Earth orbit (MEO) satellites to GNSS receivers to determine position and velocity information for the GNSS receivers. Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing.

Despite the progress of VR and AR technologies, linking VR and AR devices to high-accuracy GNSS data has proven difficult. Accordingly, there is a need in the art for improved methods and systems related to VR and AR technology.

SUMMARY

According to one aspect of the technology described herein, a method for displaying underground assets using an electronic device may include capturing a camera image of a ground having a ground surface, determining a placement of a virtual pit in the camera image, generating a pit view comprising the virtual pit and a virtual representation of an underground asset based on asset data associated with the underground asset, and generating a superimposed image comprising the camera image and the pit view.

In some embodiments, a top opening of the virtual pit may align with the ground surface in the camera image. A portion of the virtual representation of the underground asset may be shown inside the virtual pit and below the top opening of the virtual pit such that a distance between the top opening and the portion of the virtual representation of the underground asset inside the virtual pit may provide a visual indication of a depth of the underground asset relative to the ground surface.

In some embodiments, capturing the camera image and displaying the superimposed image may be performed in real time.

In some embodiments, determining the placement of the virtual pit may include determining a ground plane, determining a location of an intersection of a virtual ray and the ground plane, and generating the virtual pit based on the location of the intersection. In some embodiments, the virtual ray may be projected from a center of a camera component configured to capture the camera image such that the intersection of the virtual ray and the ground plane may be near a center of the camera image.

In some embodiments, determining the ground plane may include determining, based on a geospatial position of the electronic device, an estimated ground plane at a predetermined distance below the electronic device. Determining the location of the intersection of the virtual ray and the ground plane may include determining a location of an intersection of the virtual ray and the estimated ground plane.

In some embodiments, the asset data may include attributes of one or more underground assets. Determining the ground plane may include determining one or more collision planes. Each of the one or more collision planes may be determined based on the attributes of the one or more underground assets. Each of the one or more collision planes may overlay the ground surface and may extend along an extension of a corresponding underground asset. Determining the location of the intersection of the virtual ray and the ground plane may include determining a location of an intersection of the virtual ray and at least one of the one or more collision planes.

In some embodiments, determining the ground plane may include recognizing the ground plane based on the captured camera image.

In some embodiments, determining the placement of the virtual pit may include accessing a height map of the ground, aligning the height map with the ground surface of the camera image, determining a location of an intersection of a virtual ray and the height map, and generating the virtual pit based on the location of the intersection. In some embodiments, the virtual ray may be projected from a center of a camera component configured to capture the camera image such that the intersection of the virtual ray and the ground plane may be near a center of the camera image.

In some embodiments, determining the placement of the virtual pit may include determining a position of a point of interest in the camera image based on a distance to the point of interest measured by an electronic distance meter (EDM) device of the electronic device, and generating the virtual pit at the point of interest.

In some embodiments, determining the placement of the virtual pit may include generating a height map of the ground using an electronic distance meter (EDM) device of the electronic device, determining a location of an intersection of a virtual ray and the height map, and generating the virtual pit based on the location of the intersection. In some embodiments, the virtual ray may be projected from a center of a camera component configured to capture the camera image such that the intersection of the virtual ray and the ground plane may be near a center of the camera image.

In some embodiments, generating the pit view may include generating a first representation of the underground asset and generating a second representation of the underground asset. The first representation of the underground asset may be generated based at least in part on one of depth information or position information of the asset data for displaying inside the virtual pit. The second representation of the underground asset may be generated based at least in part on one of the depth information or position information of the asset data for displaying at the ground surface in the superimposed image.

In some embodiments, generating the pit view may further include determining pixels of the first representation of the underground asset that may be within a predetermined radius of a center of the virtual pit for displaying in the superimposed image. Generating the pit view may further include determining pixels of the second representation of the underground asset that may be outside the predetermined radius of the center of the virtual pit for displaying in the superimposed image. In some embodiments, generating the pit view may further include generating a pit mask configured to render any virtual representation inside the virtual pit and behind the pit mask transparent.

According to another aspect of the technology described herein, an electronic device for displaying underground assets may include a global navigation satellite system (GNSS) receiver configured to determine a geospatial position of the GNSS receiver, and an electronic distance measuring (EDM) device configured to capture a distance to a point of interest. In some embodiments, the GNSS receiver and the EDM device may be configured to be communicatively coupled to a camera via one or more processors. The one or more processes may be configured to perform operations comprising: capturing a camera image, using the camera, of a ground having a ground surface; determining a placement of a virtual pit in the camera image using at least one of the GNSS receiver and the EDM device; generating a pit view comprising the virtual pit and a virtual representation of an underground asset based on asset data associated with the underground asset; and generating a superimposed image comprising the camera image and the pit view.

In some embodiments, a top opening of the virtual pit may align with the ground surface in the camera image. A portion of the virtual representation of the underground asset may be shown inside the virtual pit and below the top opening of the virtual pit such that a distance between the top opening and the portion of the virtual representation of the underground asset inside the virtual pit may provide a visual indication of a depth of the underground asset relative to the ground surface.

In some embodiments, capturing the camera image and displaying the superimposed image may be performed in real time.

In some embodiments, determining the placement of the virtual pit may include determining a ground plane, determining a location of an intersection of a virtual ray and the ground plane, and generating the virtual pit based on the location of the intersection. The virtual ray may be projected from a center of the camera such that the intersection of the virtual ray and the ground plane may be near a center of the camera image.

In some embodiments, determining the ground plane may include determining, based on the geospatial position of the GNSS receiver, an estimated ground plane at a predetermined distance below the GNSS receiver. Determining the location of the intersection of the virtual ray and the ground plane may include determining a location of an intersection of the virtual ray and the estimated ground plane.

In some embodiments, the asset data may include attributes of one or more underground assets. Determining the ground plane may include determining one or more collision planes. Each of the one or more collision planes may be determined based on attributes of the one or more underground assets such that each of the one or more collision planes may overlay the ground surface and may extend along an extension of a corresponding underground asset. Determining the location of the intersection of the virtual ray and the ground plane may include determining a location of an intersection of the virtual ray and at least one of the one or more collision planes.

In some embodiments, determining the ground plane may include recognizing the ground plane based on the captured camera image.

In some embodiments, determining the placement of the virtual pit may include accessing a height map of the ground, aligning the height map with the ground surface of the camera image, determining a location of an intersection of a virtual ray and the height map, and generating the virtual pit based on the location of the intersection. The virtual ray may be projected from a center of the camera such that the intersection of the virtual ray and the ground plane may be near a center of the camera image.

In some embodiments, determining the placement of the virtual pit may include determining a position of a point of interest in the camera image based on a distance to the point of interest measured by the EDM device, and generating the virtual pit at the point of interest.

In some embodiments, determining the placement of the virtual pit may include generating a height map of the ground using the EDM device, determining a location of an intersection of a virtual ray and the height map, and generating the virtual pit based on the location of the intersection. The virtual ray may be projected from a center of the camera such that the intersection of the virtual ray and the ground plane may be near a center of the camera image.

In some embodiments, generating the pit view may include generating a first representation of the underground asset and generating a second representation of the underground asset. The first representation of the underground asset may be generated based at least in part on one of depth information or position information of the asset data for displaying inside the virtual pit. The second representation of the underground asset may be generated based at least in part on one of the depth information or position information of the asset data for displaying at the ground surface in the superimposed image.

In some embodiments, generating the pit view may further include determining pixels of the first representation of the underground asset that may be within a predetermined radius of a center of the virtual pit for displaying in the superimposed image. Generating the pit view may further include determining pixels of the second representation of the underground asset that may be outside the predetermined radius of the center of the virtual pit for displaying in the superimposed image. In some embodiments, generating the pit view may further include generating a pit mask configured to render any virtual representation inside the virtual pit and behind the pit mask transparent.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Existing technologies for displaying one or more underground assets, such as pipes, cables, manholes, etc., using an augmented reality (AR) devices typically display a visual representation of the underground asset that overlays the surface of the ground. Typically, such visual representation does not move relative to the ground surface when viewed from different positions by a user of the AR device. The lack of movement in the apparent position of the underground asset can cause the false indication that the underground asset is disposed at the ground surface as opposed to being disposed at a certain depth below the ground surface. Even if the visual representation of the underground asset may be displayed to move depending on the viewing position by taking into account the parallax effect, such movement can be difficult for the user to perceive correctly as the underground asset may appear to be floating above the ground surface as opposed to being located below the ground surface. In other words, the manner in which existing technologies display the underground asset lacks depth reference to the ground or direct connection to the real world. The floating appearance leads to an optical parallax illusion and causes users to doubt the reliability of the data.

The technology described herein creates and displays a pit view that can be overlaid onto a camera image of the real world for displaying underground assets to a user. The underground assets may be displayed in a virtual pit in the ground. With the aid of the virtual pit, the user is provided with a visual clue as to the correct depth of the underground asset relative to the ground surface. The optical parallax illusion associated with existing technologies is resolved as the underground asset is displayed inside the virtual pit, as opposed to floating above the ground surface. Further, the technology described herein allows for the creation and displaying of the pit view together with the camera image captured in real time.

Figure 1:
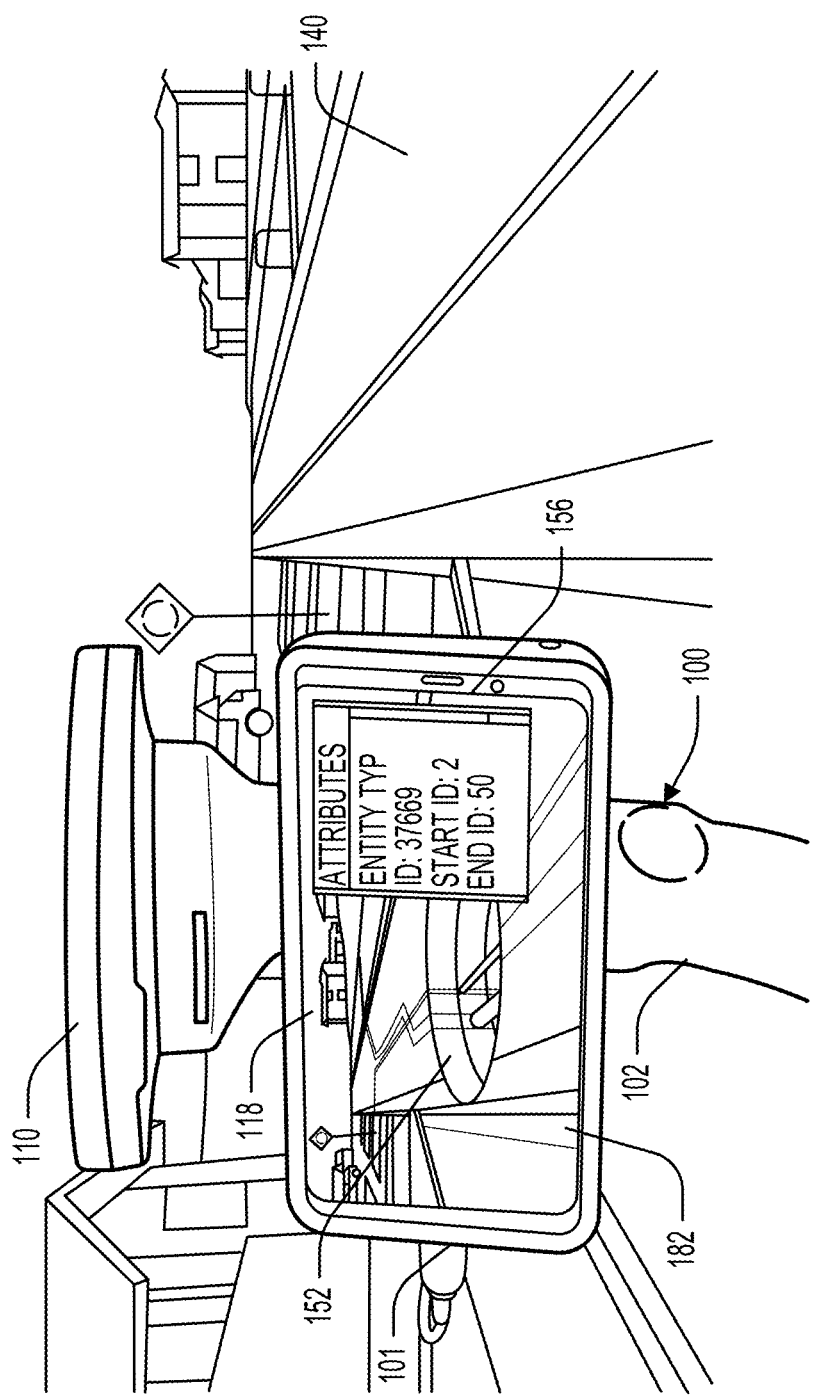
FIG. 1 illustrates an exemplary augmented reality (AR) device through which the technology described herein may be implemented, according to some embodiments of the present invention.

FIG. 1 illustrates an exemplary augmented reality (AR) device 100 through which the technology described herein may be implemented, according to some embodiments of the present invention. The AR device 100 may include a camera component 101 attached to a sensor component 102. The AR device 100 may be used at a potential construction site 140 or at any location where two dimensional (2D) or three dimensional (3D) rendered models may be displayed and superimposed onto images of real world objects such as the earth, water, stationary objects (e.g., roads, trees, buildings, etc.), movable objects (e.g., people, animals, vehicles, etc.), among other possibilities. The camera component 101 may include a camera 116 (not shown in FIG. 1; shown in FIGS. 2A and 2B) for capturing a camera image 118 and a display 156 for displaying a pit view 152 that is superimposed onto the camera image 118, collectively referred to as a superimposed image 182. The sensor component 102 may include a GNSS receiver 110 for providing high-accuracy position data of the GNSS receiver 110.

In some embodiments, the sensor component 102 includes an electronic distance measurement (EDM) device 146 (not shown in FIG. 1; shown in FIGS. 2A and 2B) for measuring distances to discrete points within the field of view of the camera 116. In some embodiments, the EDM device 146 is a lidar device that transmits pulsed laser light towards a point of interest and measures the reflected pulses with a sensor. The distance between the lidar device and the point of interest is estimated based on the return time. In some embodiments, the EDM device 146 is a radar device that transmits an electromagnetic signal via an antenna towards the point of interest and measures the reflected electromagnetic signal via the transmitting antenna or a different receiving antenna. The distance between the radar device and the point of interest is estimated based on the return time. The EDM device 146 may detect distances in a single direction or, in some embodiments, the EDM device 146 may detect distances in multiple directions and may generate a distance map comprising a plurality of detected distances.

Each of the camera component 101 and the sensor component 102 may comprise one or more structural components to support the attachment or integration of other components. For example, the sensor component 102 may include a frame that allows attachment or integration of the GNSS receiver 110 to the frame and attachment or integration of the EDM device 146 to the frame. When attached or integrated to the frame, the GNSS receiver 110 may have a known physical relationship to the EDM device 146. As another example, the camera component 101 may include a structural component that allows the camera component 101 to be removably or permanently attached to the sensor component 102 or the frame thereof. Similarly, the sensor component 102 may include a structural component that allows the sensor component 102 to be removably or permanently attached to the camera component 101. The above-described structural components may include screws, bolts, nuts, brackets, clamps, magnets, adhesives, etc., to assist in attachment of the various components.

Figure 2A:
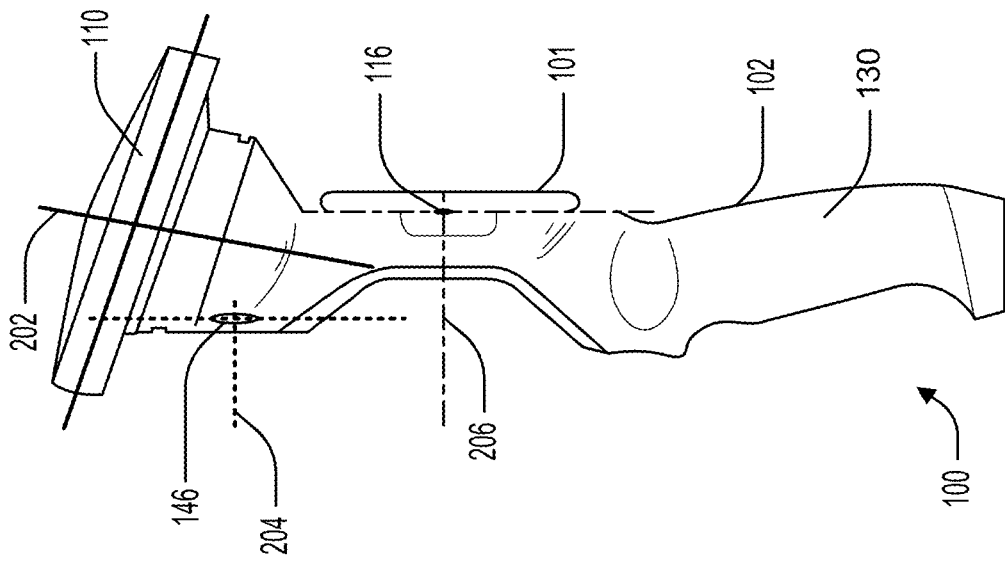
FIGS. 2A and 2B illustrate front and side views of an AR device when a camera component is attached to a sensor component, according to some embodiments of the present invention.
Figure 2B:
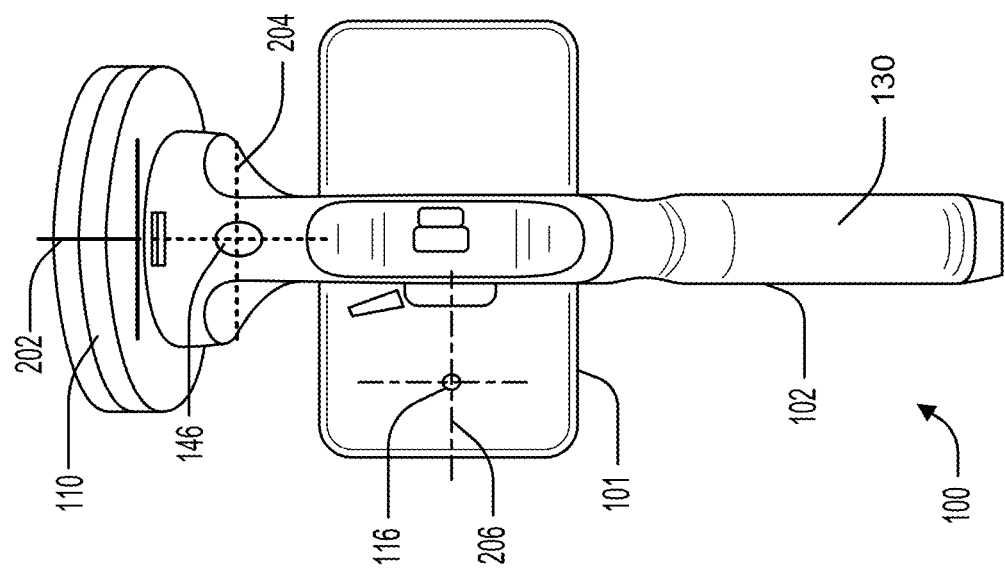

FIGS. 2A and 2B illustrate front and side views of the AR device 100 when the camera component 101 is attached to the sensor component 102, according to some embodiments of the present invention. In the illustrated embodiment, the position and orientation of the GNSS receiver 110 is indicated by crosshairs 202, the position and orientation of the EDM device 146 is indicated by crosshairs 204, and the position and orientation of the camera 116 is indicated by crosshairs 206. The position of the GNSS receiver 110 may correspond to the phase center of the receiver's antenna, the position of the EDM device 146 may correspond to the location(s) of the device's emitter and/or receiver, and the position of the camera 116 may correspond to a point where the camera aperture is located (in accordance with the pinhole camera model). When the camera component 101 is attached to the sensor component 102, detection of the orientation and position of any one of the three devices can be used to obtain the orientations and positions of the other two devices. Furthermore, detection of the orientations and positions of two of the three devices may allow a more accurate calculation of the orientation and position of the remaining device.

The AR device 100 may be a handheld device and may incorporate a handle 130 that facilitates handling of the AR device 100 by a user. The handle 130 may be formed as an integral part of the frame of the sensor component 102. Although a handheld AR device 100 is described herein as an exemplary device via which the technology described herein may be implemented, the present technology may be implemented via other AR devices, including but not limited to handheld devices, such as smart phones or tablets, hands-free devices, wearable devices, smart glasses, or any devices that may incorporate AR capabilities.

Figure 3:
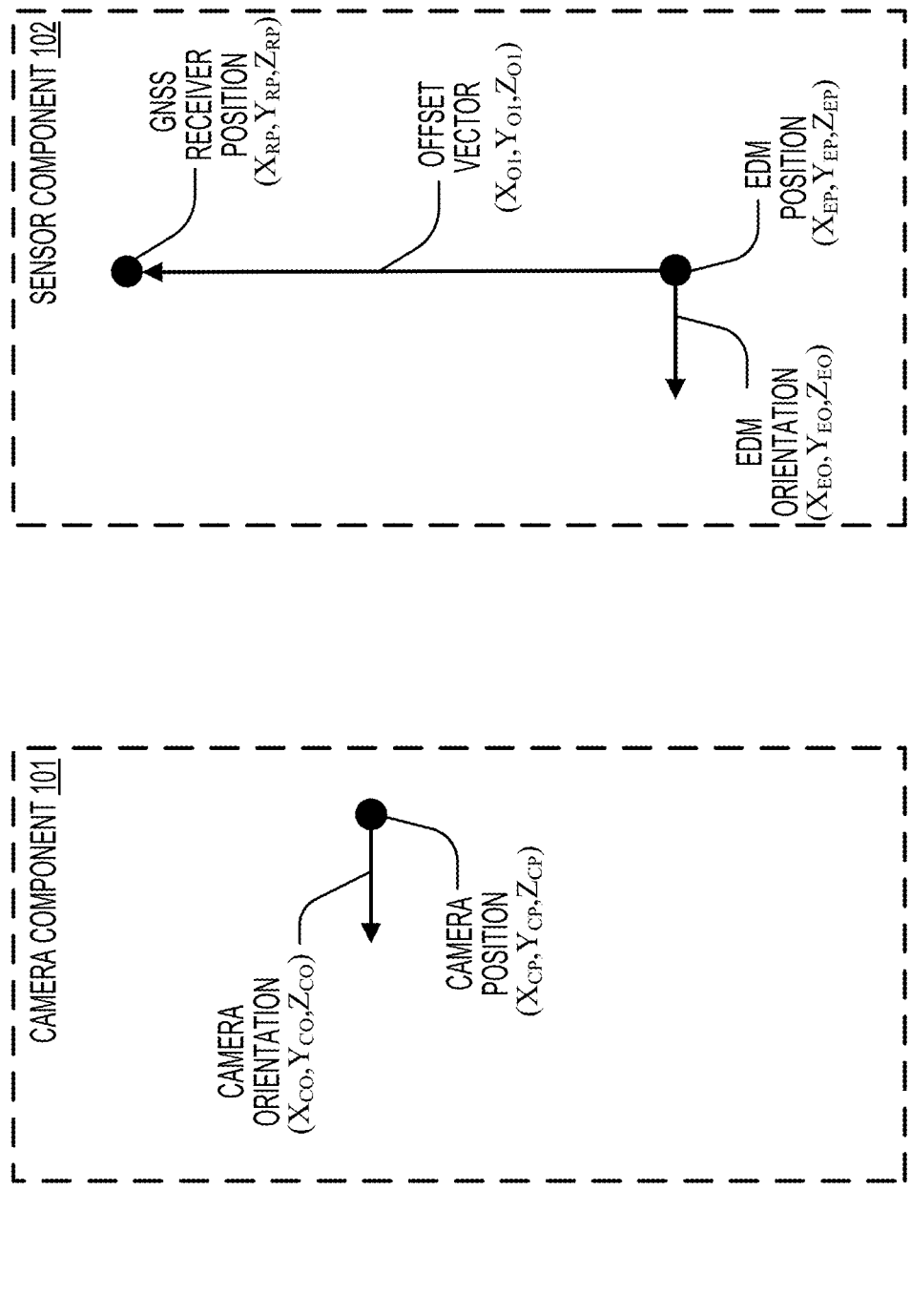
FIG. 3 illustrates a diagram showing position and orientation relationships of an AR device in which a camera component is detached from a sensor component, according to some embodiments of the present invention.

FIG. 3 illustrates a diagram showing position and orientation relationships of the AR device 100 in which the camera component 101 is detached from the sensor component 102, according to some embodiments of the present invention. In the illustrated embodiment, a first offset vector $(X_{O1}, Y_{O1}, Z_{O1})$ is defined as the vector extending between the position of the EDM device 146 $(X_{EP}, Y_{EP}, Z_{EP})$ and the position of the GNSS receiver 110 $(X_{RP}, Y_{RP}, Z_{RP})$. In some embodiments, knowledge of the first offset vector $(X_{O1}, Y_{O1}, Z_{O1})$ and one of the position of the EDM device 146 $(X_{EP}, Y_{EP}, Z_{EP})$ and the position of the GNSS receiver 110 $(X_{RP}, Y_{RP}, Z_{RP})$ can be used to find the other of the position of the EDM device 146 $(X_{EP}, Y_{EP}, Z_{EP})$ and the position of the GNSS receiver 110 $(X_{RP}, Y_{RP}, Z_{RP})$. In some embodiments, the relationship between (e.g., angle formed by) the first offset vector $(X_{O1}, Y_{O1}, Z_{O1})$ and the orientation of the EDM device 146 $(X_{EO}, Y_{EO}, Z_{EO})$ is known and may be utilized in a way such that knowledge of the orientation of the EDM device 146 $(X_{EO}, Y_{EO}, Z_{EO})$ and one of the position of the EDM device 146 $(X_{EP}, Y_{EP}, Z_{EP})$ and the position of the GNSS receiver 110 $(X_{RP}, Y_{RP}, Z_{RP})$ can be used to find the other of the position of the EDM device 146 $(X_{EP}, Y_{EP}, Z_{EP})$ and the position of the GNSS receiver 110 $(X_{RP}, Y_{RP}, Z_{RP})$.

Figure 4:
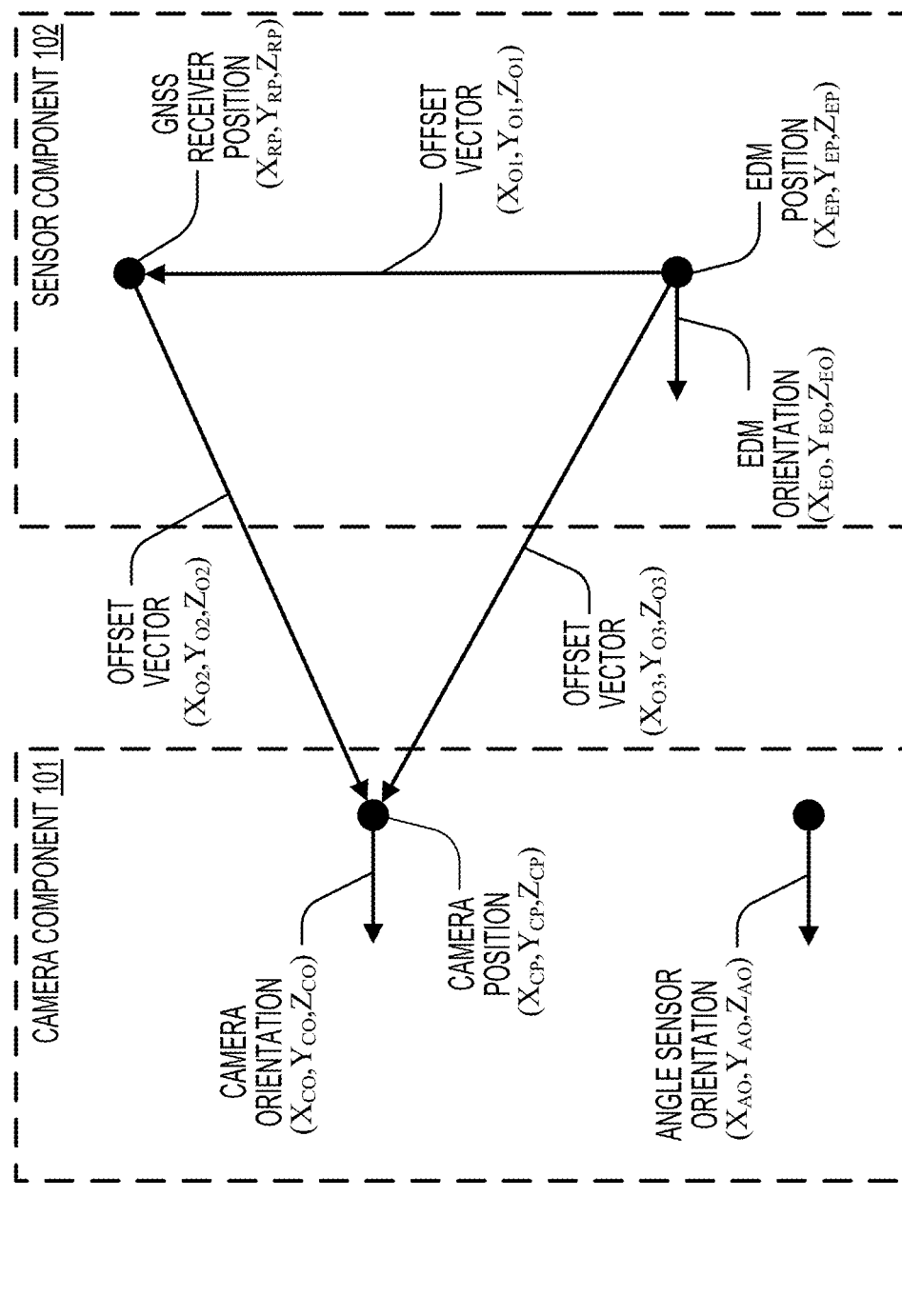
FIG. 4 illustrates a diagram showing position and orientation relationships of an AR device in which a camera component is attached to a sensor component, according to some embodiments of the present invention.

FIG. 4 illustrates a diagram showing position and orientation relationships of the AR device 100 in which the camera component 101 is attached to the sensor component 102, according to some embodiments of the present invention. In the illustrated embodiment, a second offset vector $(X_{O2}, Y_{O2}, Z_{O2})$ is defined as the vector extending between the position of the GNSS receiver 110 $(X_{RP}, Y_{RP}, Z_{RP})$ and the position of the camera 116 $(X_{CP}, Y_{CP}, Z_{CP})$, and a third offset vector $(X_{O3}, Y_{O3}, Z_{O3})$ is defined as the vector extending between the position of EDM device 146 $(X_{EP}, Y_{EP}, Z_{EP})$ and the position of the camera 116 $(X_{CP}, Y_{CP}, Z_{CP})$. In some embodiments, knowledge of the second offset vector $(X_{O2}, Y_{O2}, Z_{O2})$ and one of the position of the GNSS receiver 110 $(X_{RP}, Y_{RP}, Z_{RP})$ and the position of the camera 116 $(X_{CP}, Y_{CP}, Z_{CP})$ can be used to find the other of the position of the GNSS receiver 110 $(X_{RP}, Y_{RP}, Z_{RP})$ and the position of the camera 116 $(X_{CP}, Y_{CP}, Z_{CP})$. In some embodiments, the relationship between (e.g., angle formed by) the second offset vector $(X_{O2}, Y_{O2}, Z_{O2})$ and the orientation of the camera 116 $(X_{CO}, Y_{CO}, Z_{CO})$ is known and may be utilized in a way such that knowledge of the orientation of the camera 116 $(X_{CO}, Y_{CO}, Z_{CO})$ and one of the position of the GNSS receiver 110 $(X_{RP}, Y_{RP}, Z_{RP})$ and the position of the camera 116 $(X_{CP}, Y_{CP}, Z_{CP})$ can be used to find the other of the position of the GNSS receiver 110 $(X_{RP}, Y_{RP}, Z_{RP})$ and the position of the camera 116 $(X_{CP}, Y_{CP}, Z_{CP})$. In some embodiments, knowledge of the third offset vector $(X_{O3}, Y_{O3}, Z_{O3})$ and one of the position of the EDM device 146 $(X_{EP}, Y_{EP}, Z_{EP})$ and the position of the camera 116 $(X_{CP}, Y_{CP}, Z_{CP})$ can be used to find the other of the position of the EDM device 146 $(X_{EP}, Y_{EP}, Z_{EP})$ and the position of the camera 116 $(X_{CP}, Y_{CP}, Z_{CP})$. In some embodiments, the relationship between (e.g., angle formed by) the third offset vector $(X_{O3}, Y_{O3}, Z_{O3})$ and the orientation of the camera 116 $(X_{CO}, Y_{CO}, Z_{CO})$ is known and may be utilized in a way such that knowledge of the orientation of the camera 116 $(X_{CO}, Y_{CO}, Z_{CO})$ and one of the position of the EDM device 146 $(X_{EP}, Y_{EP}, Z_{EP})$ and the position of the camera 116 $(X_{CP}, Y_{CP}, Z_{CP})$ can be used to find the other of the position of the EDM device 146 ($X_{EP}$, $Y_{EP}$, $Z_{EP}$) and the position of the camera 116 ($X_{CP}$, $Y_{CP}$, $Z_{CP}$).

Each of the offset vectors has a fixed length when the camera component 101 is attached to the sensor component 102. Because each of the offset vectors are connected to the other two offset vectors, knowledge of any two of the offset vectors can be used to find the third offset vector.

Figure 5:
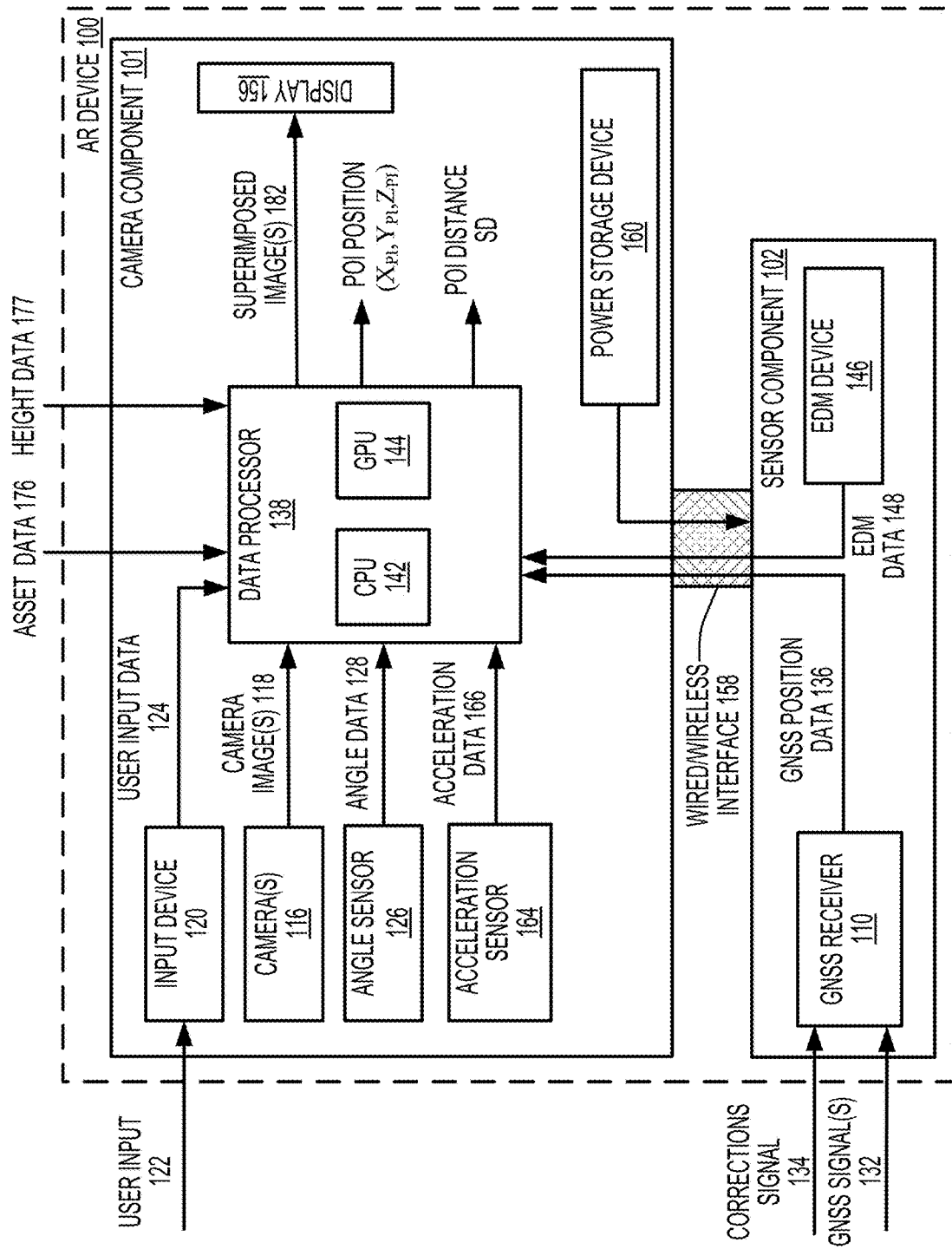
FIG. 5 illustrates a block diagram of an AR device in which a camera component is attached to a sensor component, according to some embodiments of the present invention.

FIG. 5 illustrates a block diagram of an AR device 100 in which a camera component 101 is attached to a sensor component 102, according to some embodiments of the present invention. Data is communicated from the sensor component 102 to the camera component 101 through a wired/wireless interface 158. In some embodiments, the interface 158 comprises a universal serial bus (USB) through which power and data can be transferred between the components. For example, the camera component 101 may include a power storage device 160 that may transfer power to the sensor component 102 via the interface 158.

In some embodiments, the camera component 101 includes an input device 120 for receiving user input 122 and generating user input data 124 based on the user input. The input device 120 may be a button, a switch, a microphone, a touchscreen (e.g., integrated into a display 156), among other possibilities. The user input 122 may indicate a point of interest (by, for example, moving a cursor being displayed on the display 156 so as to indicate the point of interest) for which a GNSS coordinate is to be calculated. In some embodiments, the camera component 101 includes a camera 116 for generating one or more camera images 118. The camera images 118 may include a single image, multiple images, a stream of images (e.g., a video), among other possibilities.

In some embodiments, the camera component 101 includes an angle sensor or tilt sensor 126 for generating angle data 128 corresponding to the orientation of the camera component 101 (and the AR device 100). The angle sensor 126 may be any electronic device capable of detecting angular rate and/or angular position. In some embodiments, the angle sensor 126 may directly detect angular rate and may integrate to obtain angular position, or alternatively the angle sensor 126 may directly measure angular position and may determine a change in angular position (e.g., determine the derivative) to obtain angular rate. In many instances, the angle sensor 126 is used to determine a yaw angle, a pitch angle, and/or a roll angle corresponding to the camera component 101 (and the AR device 100). Accordingly, in various embodiments the angle data 128 may include one or more of a yaw angle, a pitch angle, a roll angle, an orientation, or raw data from which one or more angles and/or orientations may be calculated. The angle sensor 126 may include one or more gyroscopes and may be included as part of an inertial measurement unit (IMU).

In some embodiments, the camera component 101 includes an acceleration sensor 164 for generating acceleration data 166 corresponding to the camera component 101 (and the AR device 100). The acceleration sensor 164 may be any electronic device capable of detecting linear acceleration. In some embodiments, the acceleration sensor 164 may directly measure linear velocity and may determine a change in linear velocity (e.g., determine the derivative) to obtain linear acceleration. Alternatively or additionally, the acceleration sensor 164 may directly measure linear position and may determine a change in linear position (e.g., determine the derivative) to obtain linear velocity, from which linear acceleration can be calculated. The acceleration data 166 may include one or more acceleration values or raw data from which one or more acceleration values may be calculated. The acceleration sensor 164 may include one or more accelerometers and may be included as part of an IMU.

In some embodiments, the camera component 101 includes a data processor 138 that includes a central processing unit (CPU) 142 and/or a graphics processing unit (GPU) 144 for processing data and generating various outputs based on the processed data. For example, the data processor 138 may generate the pit view 152 and the superimposed image 182 displayed by the display 156, a position of a point of interest ($X_{PI}$, $Y_{PI}$, $Z_{PI}$), a distance (e.g., a slope distance SD) between the AR device 100 and the point of interest, etc. The data processor 138 may receive data from various sources, including but not limited to, asset data 176 associated with underground assets, height data 177 indicating height or elevation of an area of interest, the user input data 124 generated by a user via the input device 120, the camera image 118 generated by the camera 116, the angle data 128 generated by the angle sensor 126, the acceleration data 166 generated by the acceleration sensor 164, the GNSS position data 136 generated by the GNSS receiver 110, and the EDM data 148 generated by the EDM device 146. The data processor 138 may use multiple types of data to make position and orientation calculations. For example, the data processor 138 may calculate position and/or orientation of the AR device 100, the GNSS receiver 110, the camera 116, and/or the EDM device 146. The data processor 138 may also analyze one or more camera images 118 to supplement orientation calculations based on the angle data 128 or position calculations based on the GNSS position data 136. As another example, the data processor 138 may use the acceleration data 166 to supplement position calculations based on the GNSS position data 136.

In some embodiments, the GNSS receiver 110 receives one or more GNSS signals 132 from one or more GNSS satellites to generate position estimates. In some embodiments, the GNSS receiver 110 also receives a corrections signal 134 (using a same or different antenna) to apply corrections to the position estimates, allowing the position estimates to improve from meter accuracy to centimeter accuracy in many cases. Alternatively or additionally, the corrections signal 134 may be received by the camera component 101 (e.g., via a wireless interface), and the data processor 138 may apply the corrections to the position estimates after receiving the GNSS position data 136 from the GNSS receiver 110.

Figure 6:
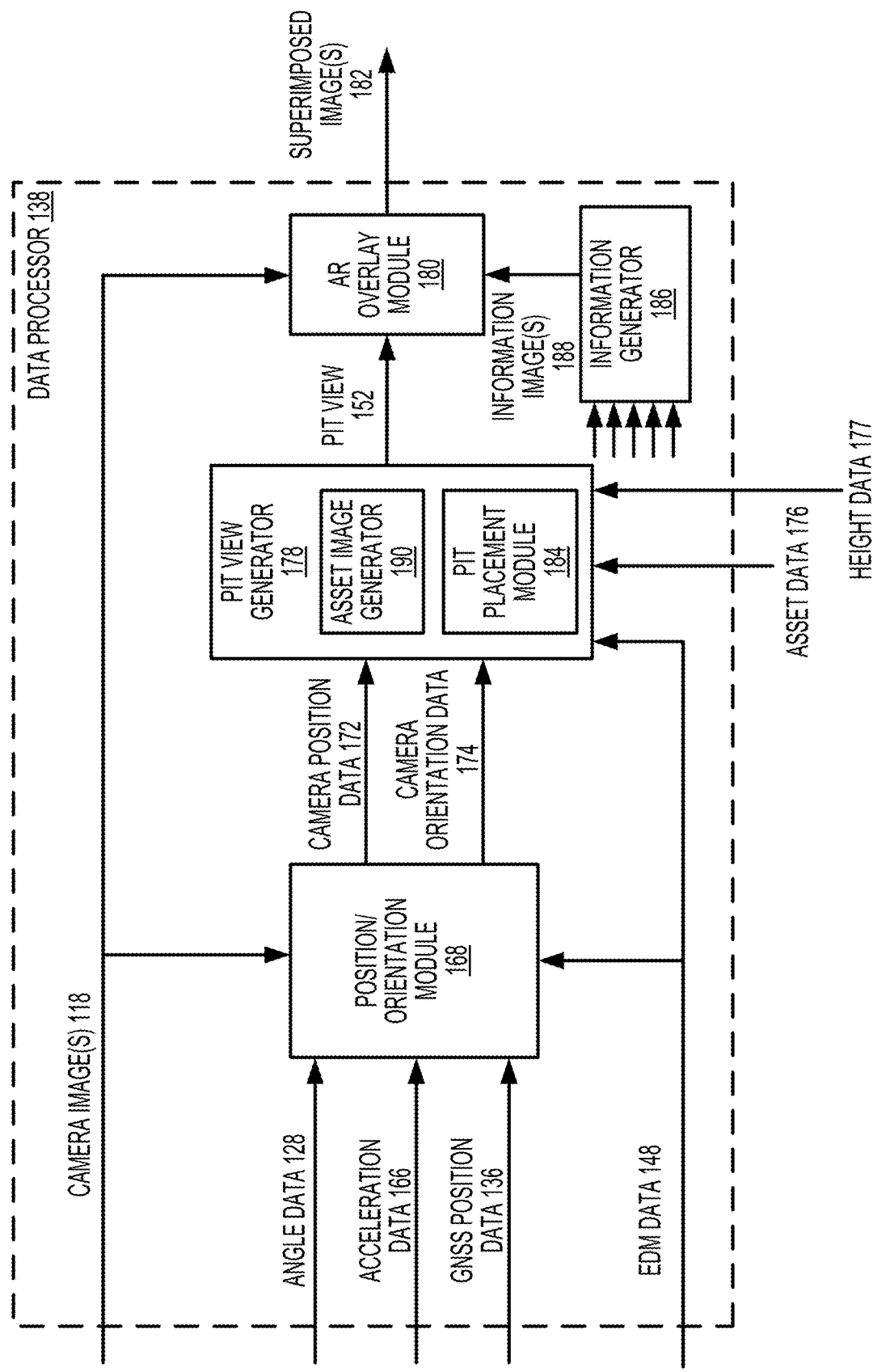
FIG. 6 illustrates a block diagram of a data processor, according to some embodiments of the present invention.

FIG. 6 illustrates a block diagram of the data processor 138, according to some embodiments of the present invention. Each of the modules and generators illustrated in FIG. 6 may be implemented in hardware and/or software. Although multiple modules and generators are shown, some or all of the various modules and/or generators may be consolidated into one single module and/or generator. In some embodiments, the data processor 138 includes a position/orientation module 168 for determining camera position data 172 and camera orientation data 174. In some embodiments, the camera position data 172 may include a 3D coordinate (e.g., three real numbers) representing the relative position of the camera 116 at a particular time. Similarly, the camera orientation data 174 may include a 3D vector (e.g., three real numbers) representing the orientation of camera 116 at a particular time. The position/orientation module 168 may be configured to output positions and orientations periodically, at non-regular intervals, or upon receiving updated data from one or more of the angle data 128, the acceleration data 166, the GNSS position data 136, the EDM data 148, and the camera image 118.

In some embodiments, the position/orientation module 168 determines/updates the camera position data 172 and the camera orientation data 174 based on the GNSS position data 136 each time new GNSS position data 136 is received (referred to as a GNSS point). In some embodiments, the position/orientation module 168 determines/updates the camera position data 172 and the camera orientation data 174 based on the angle data 128, the acceleration data 166, or the camera image 118 each time new angle data 128, acceleration data 166, or camera image 118 is received (referred to as an AR point). In some instances, performance of the AR device 100 is improved when AR points and GNSS points are conjunctively used to determine the camera position data 172. In some instances, this is accomplished by maintaining two separate and independent frames: an AR frame (corresponding to AR points) and a geospatial frame (corresponding to GNSS points). The AR frame represents a camera space which maintains the relationship between different AR points. For example, a first AR point at a first time may be (0, 0, 0) within the AR frame, a second AR point at a second time may be (22.3, −12.6, 0) within the AR frame, and a third AR point at a third time may be (34.0, −22.9, −0.1) within the AR frame. Any operations performed on the AR frame, such as shifting or rotating, causes all points within the AR frame to be similarly affected. For example, shifting the AR frame by (0, 5, 0) would cause the three AR points to become (0, 5, 0), (22.3, −7.6, 0), and (34.0, −17.9, −0.1), respectively.

Similar to the AR frame, the geospatial frame represents a GNSS space which maintains the relationship between different GNSS points (3D positions determined based on the GNSS position data 136). For example, a first GNSS point at a first time may be (10, 10, 10) within the geospatial frame, a second GNSS point at a second time may be (32.3, −2.6, 10) within the geospatial frame, and a third GNSS point at a third time may be (44.0, −12.9, 9.9) within the geospatial frame. Any operations performed on the geospatial frame, such as shifting or rotating, causes all points within the geospatial frame to be similarly affected. For example, shifting the geospatial frame by (0, 5, 0) would cause the three GNSS points to become (10, 15, 10), (32.3, 2.4, 10), and (44.0, −7.9, 9.9), respectively.

Figure 7:
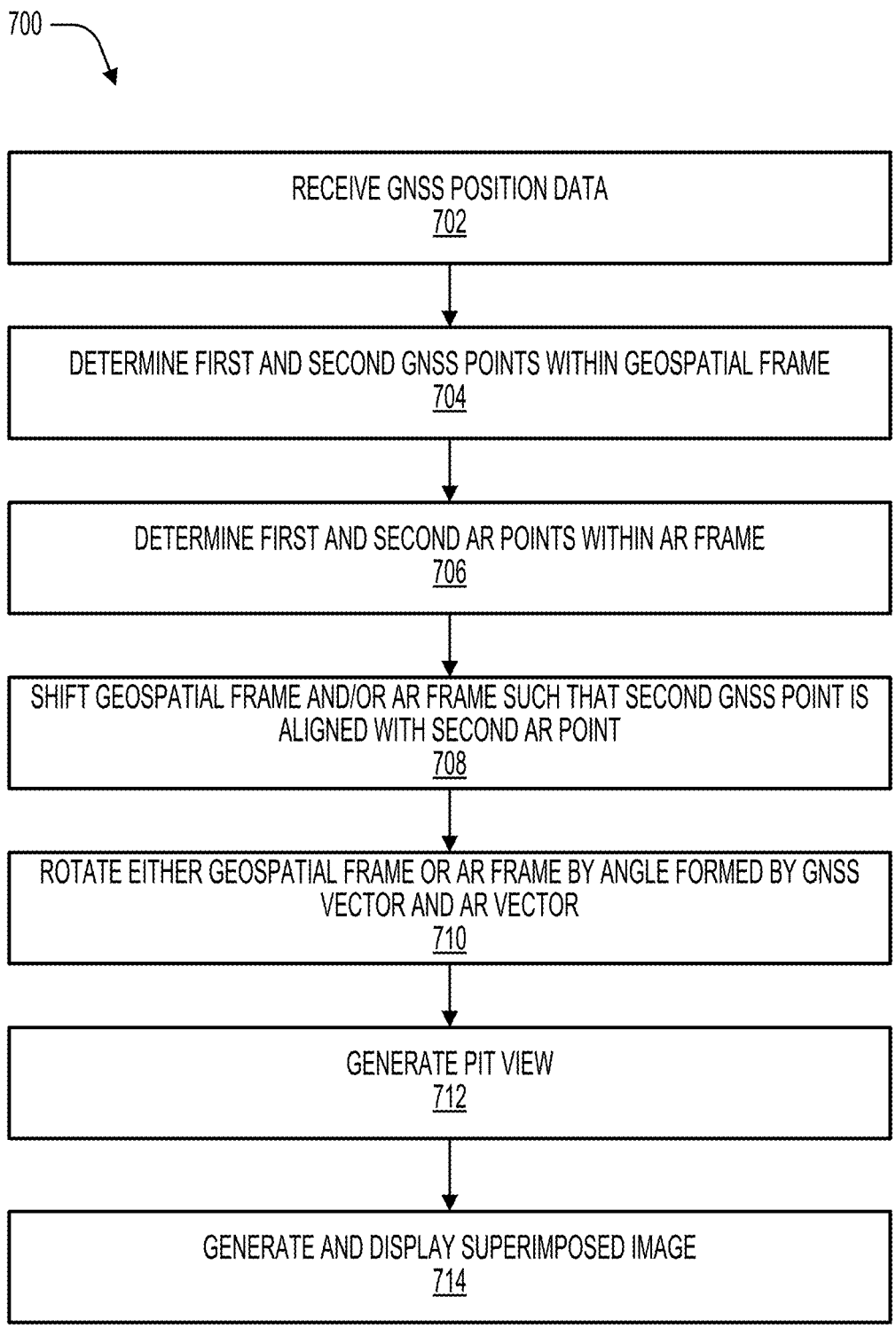
FIG. 7 illustrates a method for synchronizing an AR frame with a geospatial frame, according to some embodiments of the present invention.

In an ideal scenario, AR points and GNSS points would be generated by position/orientation module 168 simultaneously and would be identical to each other. However, due to the differences between the two technologies, this is generally not the case. For example, the GNSS position data 136 is generally received less frequently than camera images 118, is generally more accurate and stable than image-based pose data (e.g., centimeter accuracy), and does not suffer from initialization issues that are problematic for image-based pose data, e.g., the establishment of a new temporary local reference frame with the first AR point is generally set to (0, 0, 0). Furthermore, because of the initialization issues associated with image-based pose data (and also due to its inferior accuracy and drift over time and distance), the AR frame and the geospatial frame do not necessarily correspond to each other and therefore must be reconciled. To resolve these issues, among others, the position/orientation module 168 may perform a series of steps in order to determine the camera position data 172 and the camera orientation data 174 that incorporate both image-based pose data and the GNSS position data 136. These steps are illustrated in FIG. 7 by method 700 and are further detailed in reference to FIGS. 8A and 8B.

In some embodiments, the AR device 100 includes a pit view generator 178 for generating the pit view 152. In some embodiments, the pit view generator 178 may include an asset image or asset representation generator 190. In some instances, the pit view generator 178 may receive the asset data 176 via a wired or wireless connection which defines an underground asset (e.g., manholes, pipes, underground utilities, etc.). The asset data 176 may include 3D coordinates corresponding to the underground assets as well as other information for generating pit view 152, such as size, shape, type, etc. In some embodiments, the asset image or representation generator 190 may be configured to generate virtual representations (e.g., 2D or 3D representations) of the underground assets. In some embodiments, the pit view generator 178 may further include a pit placement module 184. The pit placement module 184 may be configured to determine the placement of the virtual pit in the pit view 152 in relation to the real world objects captured by the camera image 118. The pit placement module 184 may determine the placement of the virtual pit based on the camera position data 172, the camera orientation data 174, the asset data 176, the height data 177, the EDM data 148, etc.

In some embodiments, the pit view generator 178 generates the pit view 152 based on each of the camera position data 172, the camera orientation data 174, the asset data 176, the placement of the virtual pit, etc. For example, as the camera position and/or orientation changes, the pit view 152 may also be modified to accurately reflect the difference in position and/or orientation (e.g., as the camera 116 points further away from the position of the AR device 100, the pit view 152 may become smaller). In some embodiments, the pit view 152 is held static until a change in one or more of the camera position data 172, the camera orientation data 174, the asset data 176, the placement of the virtual pit, etc., is detected by pit view generator 178.

In some embodiments, the AR device 100 includes an AR overlay module 180 for generating a superimposed image 182 by superimposing the pit view 152 onto the camera image 118 (or by superimposing the camera image 118 onto pit view 152). In some instances, the superimposed image 182 is output to the display 156 which displays the superimposed image 182 for viewing by a user. In some embodiments, the AR device 100 includes an information generator 186 for generating information that may be added to the superimposed image 182. For example, the information generator 186 may generate an information image 188 that may visually display information about the underground assets (e.g., position, size, type, year established, etc.), the position/orientation of AR device 100, the position of the point of interest $(X_{PI}, Y_{PI}, Z_{PI})$ (e.g., the center of the virtual pit of the pit view 152), a distance to the point of interest, among other possibilities. Accordingly, the superimposed image 182 may be generated to include portions of the camera image 118, the pit view 152, and/or the information image 188. In some instances, a user may select the content to be included in the information image 188 for display.

FIG. 7 illustrates a method 700 for synchronizing an AR frame with a geospatial frame, according to some embodiments of the present invention. Steps of method 700 may be performed in any order, and not all steps of method 700 need be performed. Method 700 may be performed continuously, periodically, or intermittently during operation of the AR device 100, among other possibilities.

At step 702, the GNSS position data 136 is received by the position/orientation module 168. At step 704, the position/orientation module 168 determines, based on the GNSS position data 136, a first GNSS point within a geospatial frame at a first GNSS time within a first time interval and a second GNSS point within the geospatial frame at a second GNSS time within a second time interval. In some embodiments, the first GNSS point and the second GNSS point form a GNSS vector.

At step 706, the position/orientation module 168 determines, based on one or more of the camera image 118, the angle data 128, and the acceleration data 166, a first AR point within an AR frame at a first AR time within the first time interval and a second AR point within the AR frame at a second AR time within the second time interval. In some embodiments, the first AR point and the second AR point form an AR vector. In one particular example, the first time interval may be from 27.3 to 30.1 seconds, the first GNSS time may be 28.6 seconds, and the first AR time may be 27.8 seconds. Continuing with the above example, the second time interval may be 45.8 to 46.1 seconds, the second GNSS time may be 45.8 seconds, and the second AR time may be 46.0 seconds. In various embodiments, the first time interval may have a length of 10 milliseconds, 100 milliseconds, 1 second, 10 seconds, 1 minute, and the like. Similarly, in various embodiments, the second time interval may have a length of 10 milliseconds, 100 milliseconds, 1 second, 10 seconds, 1 minute, and the like. In some embodiments, the first time interval and the second time interval may not overlap, although in other embodiments they may overlap by an insignificant amount (e.g., 5%, 10% overlap).

At step 708, the position/orientation module 168 shifts the geospatial frame and/or the AR frame such that the second GNSS point is aligned with the second AR point. At step 710, the position/orientation module 168 calculates the angle formed by the GNSS vector and the AR vector and rotates either the geospatial frame to the AR frame or the AR frame to the geospatial frame by the calculated angle, thereby causing the GNSS vector to become aligned with the AR vector. In some embodiments, both the geospatial frame and the AR frame are rotated until the GNSS vector is aligned with the AR vector. For example, if the calculated angle is 45 degrees, the geospatial frame may be rotated by 45 degrees, the AR frame may be rotated by 45 degrees (in the opposite direction), or both frames may be rotated by amounts that sum to 45 degrees (e.g., 22.5 degrees each).

At step 712, the pit view generator 178 generates the pit view 152 based on the asset data 176, the EDM data 176, the placement of the virtual pit, the shift performed in step 708, the rotation performed in step 712, the camera position data 172, and/or the camera orientation data 174. In general, improved performance of the AR device 100 may be achieved where the image or representations of the underground assets defined by the asset data 176 is shifted and rotated along with the geospatial frame but not with the AR frame. For example, in some embodiments where only the geospatial frame is shifted and rotated, the asset image or representations of the underground assets is shifted and rotated along with the geospatial frame so that it is displayed properly within the pit view 152. In other embodiments where only the AR frame is shifted and rotated, the model may retain its original coordinates.

At step 714, the AR overlay module 180 generates the superimposed image 182 and the display 156 displays the superimposed image 182. The superimposed image 182 may be generated by superimposing the pit view 152 onto the camera image 118 (or by superimposing the camera image 118 onto pit view 152).

Figure 8A:
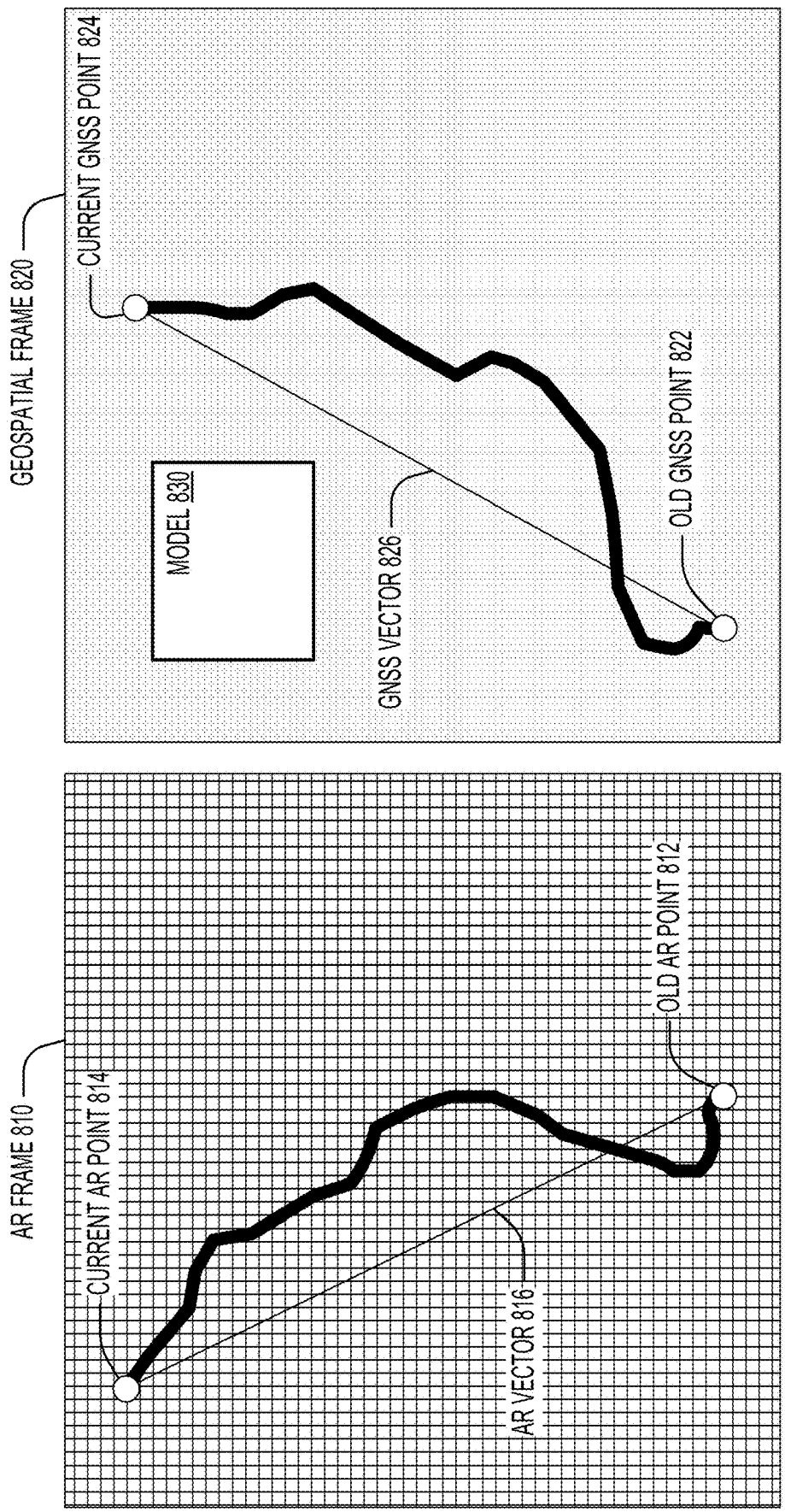
FIGS. 8A and 8B illustrate steps of a method, according to some embodiments of the present invention.
Figure 8B:
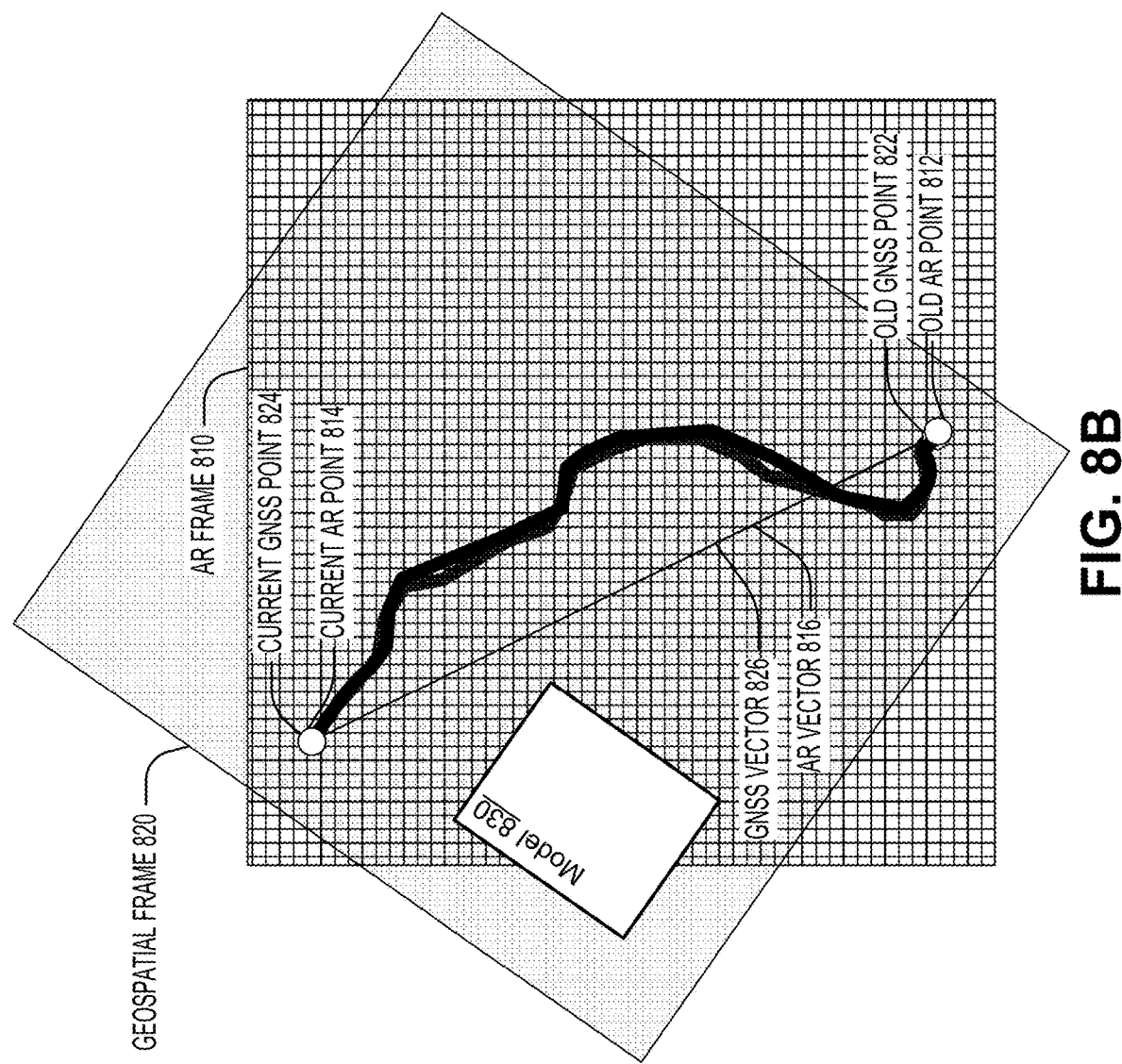

FIGS. 8A and 8B illustrate steps of method 800, according to some embodiments of the present invention. Referring to FIG. 8A, an old GNSS point 822 within a geospatial frame 820 and an old AR point 812 within an AR frame 810 may be determined at a first time, and a current GNSS point 824 within the geospatial frame 820 and a current AR point 814 within the AR frame 810 may be determined at a second time. Between the first time and the second time, additional points may be determined for both frames (as shown by the two thick solid lines). In some embodiments, the second time may be when an additional GNSS point becomes available after the first time. For example, although AR points may be determined on the milliseconds timescale, GNSS points may only be available every few seconds. GNSS points may be particularly delayed in situations where the AR device 100 is being used with limited satellite visibility. For example, where the AR device 100 is being used under a tree or in a building, GNSS points may only be available once every few minutes. In some embodiments, a model 830 as defined by the asset data 176 may be configured within the geospatial frame 820 as shown in FIG. 8A. The model 830 may be included within the geospatial frame 820 such that the model 830 may be shifted and/or rotated along with the geospatial frame 820. As described herein, the model 830 may be a virtual representation of any number of structures, e.g., house, building, tree, underground utilities, etc.

Referring to FIG. 8B, one or both of the geospatial frame 820 and the AR frame 810 may be shifted such that the current GNSS point 824 is aligned with the current AR point 814, and either the geospatial frame 820 is rotated to the AR frame 810 or the AR frame 810 is rotated to the geospatial frame 820 by an angle 840, causing the GNSS vector 826 to become aligned with the AR vector 816. Alignment may occur over several dimensions. For example, the geospatial frame 810 may be shifted in each of three dimensions. Upon alignment of the current GNSS point 824 with the current AR point 814, the GNSS vector 826 becomes aligned with the AR vector 816 on at least one end of the GNSS vector 826. Rotation of the frames may occur over several dimensions. For example, the geospatial frame 810 may be rotated in each of three dimensions.

Figure 9:
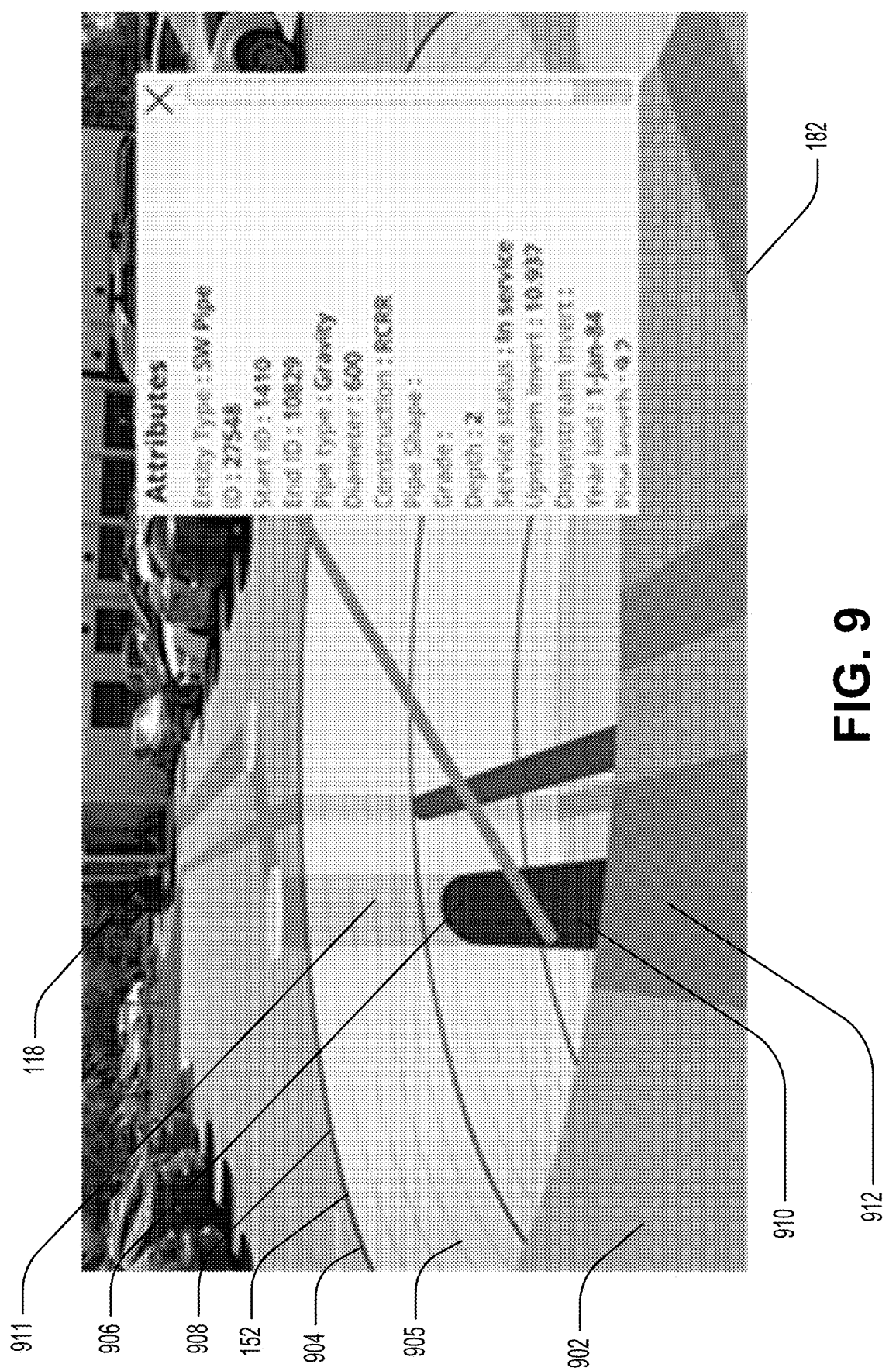
FIG. 9 illustrates an exemplary superimposed image displayed by an AR device, according to some embodiments of the present invention.

FIG. 9 illustrates an exemplary superimposed image 182 displayed by an AR device, such as the AR device 100 described above, according to some embodiments of the present invention. The superimposed image 182 may include a camera image 118 and a pit view 152. The camera image 118 may be captured by the camera 116 of the AR device 100. The camera image 118 may show real world objects including a ground surface 902. The pit view 152 may include a virtual pit 905 and virtual representations 906 of underground assets. The virtual pit 905 may include a top opening 908 and a depth. The top opening 908 of the virtual pit 905 may terminate at or align with the ground surface 902 such that the virtual pit 905 may appear as a pit dug in the ground, similar to, e.g., an excavation pit at a construction site. As will be discussed in more detail below, by displaying the underground assets using the pit view 152, a user of the AR device 100 for viewing the underground assets is provided with a direct depth reference of the underground assets in relation to ground surface 902.

The virtual representations 906 of the underground assets may be generated based on asset data or asset attributes associated with each underground asset, such as shape, size (e.g., diameter, depth, length, etc.), type, location, and so on. The virtual representations 906 may include 2D and/or 3D representations of the underground asset. For example, a portion of the underground asset may be disposed in the real world below the ground surface 902 and thus may be displayed inside the virtual pit 905 as a 3D virtual representation 910 of the underground asset. The portion of the underground asset that is outside the virtual pit 905 may be displayed outside the virtual pit 905 following the contour of the ground surface 902 as a 2D virtual representation 912 of the underground asset. Although in the example shown in FIG. 9, the portion of the underground asset inside the virtual pit 905 is displayed as a 3D virtual representation and the portion of the underground asset outside the virtual pit 905 is displayed as a 2D virtual representation, either the portion of the underground asset inside the virtual pit 905 or the portions outside the virtual pit 905 may be displayed as 2D and/or 3D virtual representations in various embodiments.

By displaying the underground asset inside the virtual pit 905, the underground asset may be given an "exposed" look as if the ground were excavated and the underground asset were exposed. As compared to the floating appearance displayed using conventional technologies, the exposed look resembles how the underground asset would appear in real world. The distance between the top opening 908 of the virtual pit 905 and the portion of the underground asset inside the virtual pit 905 provides a visual indication of the depth at which the underground asset is disposed below the ground surface 902. Thus, by superimposing the virtual pit 905 over the ground surface 902 and displaying a portion of the underground asset inside the virtual pit 905, the technology described herein provides a correct depth reference of the underground assets relative to the ground surface 902 and a direct connection to the real world for the user. Further, because the portion of the ground surface 902 overlapping with the virtual pit 905 may be entirely occluded by the virtual pit 905, movement of the underground asset due to the change in the viewing direction from the user would be displayed as movement relative to the pit wall behind the underground asset, as opposed to movement relative to the ground surface 902 in the conventional technologies. Thus, the present technology avoids the parallax illusion associated with conventional technologies that causes user confusion.

Figure 10:
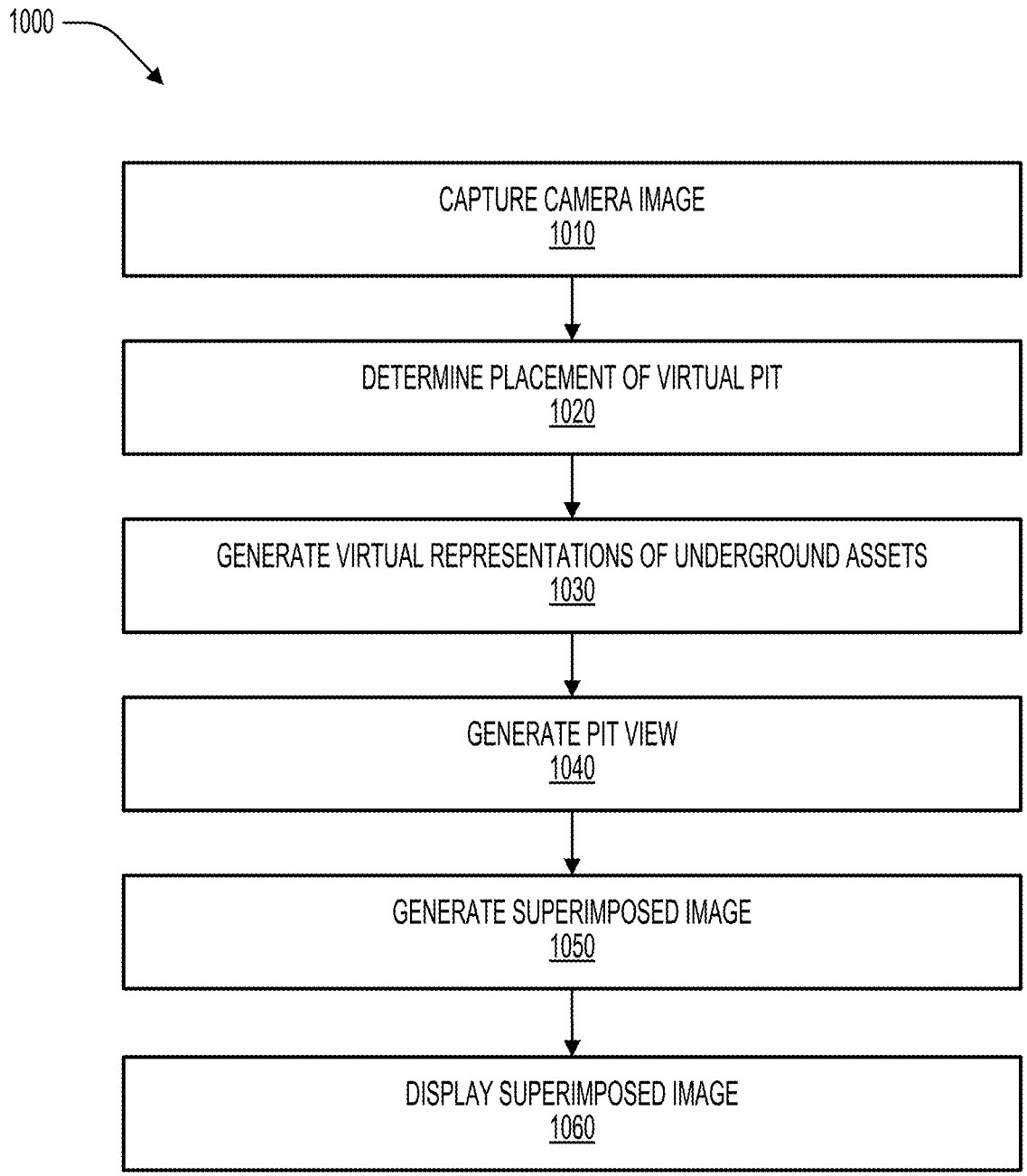
FIG. 10 illustrates operations of a method for displaying underground assets, according to some embodiments of the present invention.

FIG. 10 illustrates operations of a method 1000 for displaying underground assets, according to some embodiments of the present invention. Operations of method 1000 may be performed in any order, and not all operations of method 1000 need be performed. Method 1000 may be performed by an AR device, such as the AR device 100, or a similar portable electronic device.

At block 1010, a camera image 118 of real world objects may be captured by a camera, such as the camera 116 of the AR device 100. The camera image 118 may include real world objects, including a ground having a ground surface 902. Underground assets may be buried in the ground under the ground surface 902. The camera image 118 may include a single image, multiple images, a stream of images (e.g., a video), among other possibilities.

At block 1020, the location or placement of a virtual pit 905 for displaying underground assets in a pit view 152 in the camera image 118 may be determined by the AR device 100. The location or placement of the virtual pit 905 may be determined such that when the virtual pit 905 and the camera image 118 are displayed together, the top opening 908 of the virtual pit 905 may align or substantially align with the ground surface 902 shown in the camera image 118. For example, the AR device 100 may determine the location or placement of the center of the top opening 908 of the virtual pit 905 on the ground surface 902. Based on the location or placement of the center of the top opening 908 of the virtual pit 905, the virtual pit 905 may be incorporated into the camera image 118 such that the top opening 908 may align or substantially align with the ground surface 902. Methods and techniques for determining the placement of the virtual pit 905 in the camera image 118 will be discussed in more detail below.

At block 1030, virtual representations 906 of one or more underground assets, such as manholes, pipes, underground utilities, etc., may be generated by the AR device 100. In some embodiments, for each underground asset, the virtual representations 906 may include a virtual representation of the portion of the underground asset inside the virtual pit 905, and may further include a virtual representation of the portion or portions of the underground asset outside the virtual pit 905. The portion or portions of the underground asset may be displayed on the ground surface 902. Thus, the virtual representation corresponding to the portion of the underground asset inside the virtual pit 905 and the virtual representation corresponding to the portion or portions of the underground asset outside the virtual pit 905 may be vertically offset from each other by a distance corresponding to the depth of the underground asset below the ground surface 902. Methods and techniques for generating the virtual representations 906 will be discussed in more detail below.

At block 840, a pit view 152 may be generated by the AR device 100. The pit view 152 may include the virtual pit 905 and the virtual representations 906 of the underground assets. Methods and techniques for generating the pit view 152 will be discussed in more detail below.

At block 1050, a superimposed image 182 may be generated by the AR device 100. The superimposed image 182 may include the camera image 118 and the pit view 152. At block 1060, the superimposed image 182 may be displayed via the display 156 of the AR device 100 to a user.

In the displayed superimposed image 182, the top opening 908 of the virtual pit 905 may align or substantially align with the ground surface 902 shown in the camera image 118 such that the virtual pit 905 may resemble a pit dug in the ground, exposing one or more underground assets below the ground surface 902 inside the virtual pit 905. Virtual representations of the underground assets may be displayed inside and outside the virtual pit 905. By displaying at least portions of the underground assets inside the virtual pit 905, the user is provided with a correct depth reference of the underground assets below the ground surface 902.

One or more of the above operations of method 1000 may be performed simultaneously or substantially simultaneously. For example, the superimposed image 182 may be generated and displayed as the AR device 100 captures the camera image 118 in real time and/or in a continuous manner. In other words, generating and/or displaying the superimposed image 182 may also be performed in real time. As the AR device 100 may be moved by the user, the camera image 118 may be updated, and the displayed superimposed image 182 may be updated simultaneously or substantially simultaneously. For example, the user may point the camera 116 of the AR device 100 at any point of interest, and an updated superimposed image 182 may be generated and displayed to the user as the point of interest changes. This way, the user may follow the underground asset using the pit view 152, obtaining a visual indication of the depth information of the underground asset. The terms "simultaneous(ly)" and "real time" used herein generally refer to the scenario where the superimposed image 182 may be generated, displayed, or updated immediately after the camera image 118 may be captured or updated, and a perceptible delay may or may not be observed by the user. In some embodiments, the delay between the time the camera image 118 is captured or updated and the time the superimposed image 182 may be generated, displayed, or updated may be less than a few seconds, e.g., less than 10 seconds, less than 1 second, less than 500 milliseconds, less than 100 milliseconds, less than 10 milliseconds, less than 1 milliseconds, or less.

The pit view 152 can be particularly beneficial when the depth of the underground asset may change in various terrain. The pit view 152 can present such depth change by changing the vertical offset of the virtual representation of the portion of the underground asset inside the virtual pit 905. Such direct visual presentation of the depth of the underground asset cannot be obtained using conventional technologies that display the underground assets at or above the ground surface.

As will be discussed in more detail below, each operation of method 1000 may include one or more sub-operations. It should be noted that the sub-operations of each operation of method 1000 may be performed in any order, and may be performed simultaneously. Additionally, one or more sub-operations of one operation of method 1000 and one or more sub-operations of another operation of method 1000 may be performed in any order and may be performed simultaneously. Thus, one or more operations of method 1000 may not be performed or completed before one or more other operations of method 1000 may begin.

Several embodiments of methods and techniques for determining the placement or position of the virtual pit 905 with respect to the real world as captured by the camera 116 will now be discussed in more detail below. The placement or position of the virtual pit 905 into the camera image 118 may be such that the top opening 908 of the virtual pit 905 may align with the ground surface 902. The embodiments described herein are for illustration purpose only and are not intended to be limiting. A person skilled in the art would understand that various modifications may be made to the techniques described below in light of the description provided herein, and various operations may be added, omitted, or combined.

Figure 11:
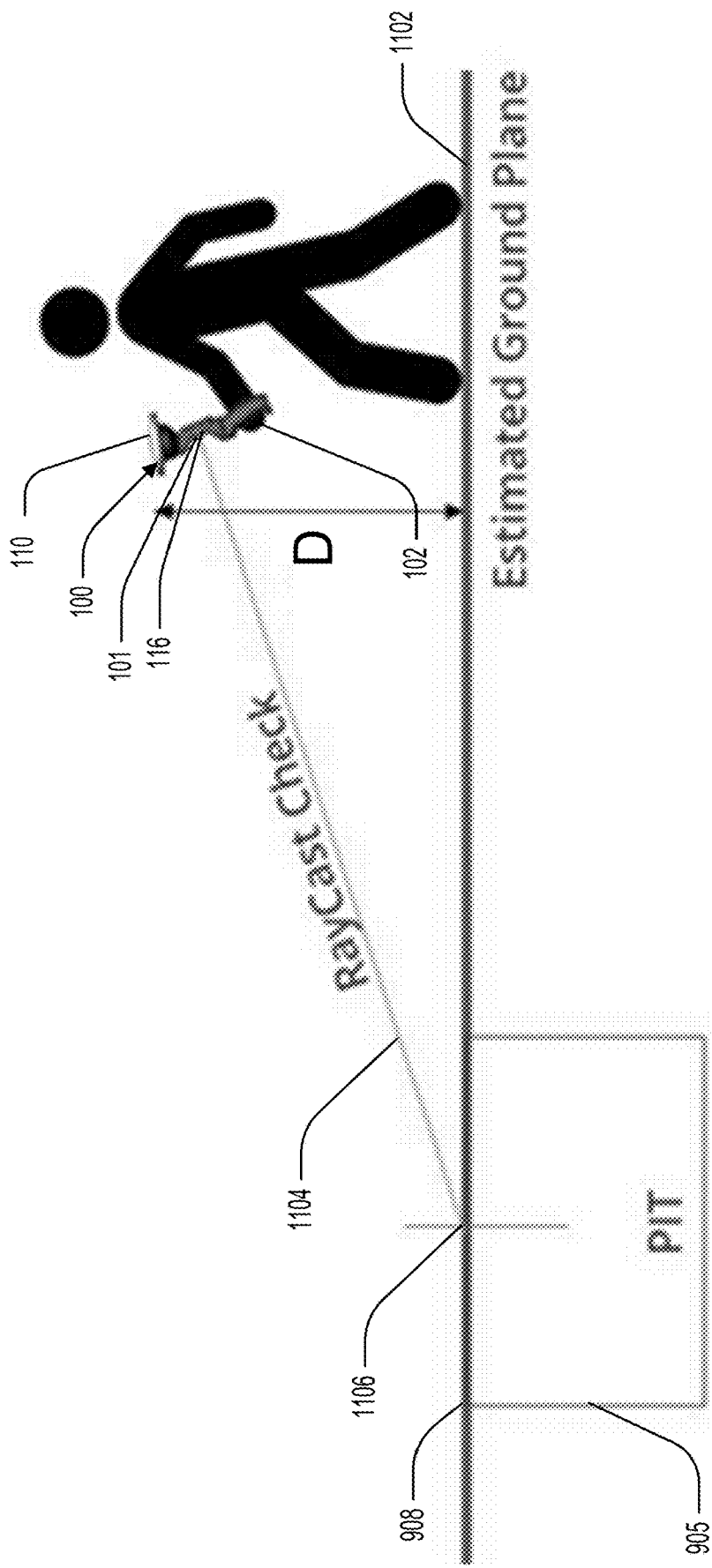
FIG. 11 illustrates a method for determining a placement or position of a virtual pit with respect to the real world, according to some embodiments of the present invention.

FIG. 11 illustrates a method for determining the placement or position of the virtual pit 905 with respect to the real world, according to some embodiments of the present invention. For example, the method may determine the position of a center of the top opening 908 of the virtual pit 905 on the ground surface 902.

In some embodiments, the position of the AR device 100 or one or more components thereof may be known. For example, the position of the GNSS receiver 110 or the antenna thereof may be known or determined based on signals received from GNSS satellites. The position of the camera 116 may also be known. For example, based on the relative position of the GNSS receiver 110 and the camera 116, which may be represented by an offset vector, and the position of the GNSS receiver 110, the position of the camera 116, e.g., the center of aperture of the camera 116, may be determined.

In some embodiments, the position of the camera 116 may be known or determined independent or semi-independent of the position of the GNSS receiver 110. For example, the camera component 101 may include another GNSS receiver for receiving GNSS signals for determining the location of the camera 116. Alternatively, the position of the camera 116 may be determined using the position of the GNSS receiver 110 and the offset vector initially, and subsequently, the change in the position of the camera 116 may be tracked by sensors, e.g., accelerometer, gyroscope, etc., of the AR device 100 to obtain an updated position of the camera 116. Updating and/or determining the position of the camera 116 using local sensors may make the position of the camera 116 available even when the GNSS signals are interrupted. The position of the camera 116 obtained using the local sensors may then be calibrated or synchronized using the GNSS signals when such signals become available.

The AR device 100 may determine an estimated ground surface or ground plane 1102 based on the position of the GNSS receiver 110 and/or the position of the camera 116. For example, the AR device 100 may determine the estimated ground plane 1102 to be at a predetermined distance below the GNSS receiver 110 or the camera 116. The predetermined distance may be determined based on a typical or average height at which the AR device 100 may be held or positioned by a user. In some embodiments, the predetermined distance may be between 1.2 m to 1.8 m, such as about 1.5 m. The predetermined distance may be adjusted and/or set for different users.

In some embodiments, the orientation of the AR device 100 or one or more components thereof may be known. For example, the orientation of the camera 116 may be known or determined utilizing an angle sensor or tilt sensor that may be included in the camera component 101 and/or the sensor component 102 of the AR device 100. The orientation of the camera 116 may be the same as the direction toward which the camera 116 may be pointed and/or the viewing direction of the user.

Along the direction in which the camera 116 is pointed, the AR device 100 may project a virtual ray 1104 from the camera 116, e.g., from the center of the aperture of the camera 116, and check if such virtual ray 1104 intersects with the estimate ground plane 1102, such as when the camera 116 is pointed toward the ground surface 902. The AR device 100 may then determine the location of the intersection 1106 between the virtual ray 1104 and the estimated ground plane 1102. The ray projecting operation to determine an intersection between the virtual ray 1104 and a plane, such as the estimated ground plane 1102 in this embodiments or other planes in different embodiments, may be referred to as the ray-check operation. Although a virtual ray 1104 is included in FIG. 11 for purpose of illustration, the ray-check operation may not involve actual radiation or emission of a ray from the AR device 100. However, in some embodiments, a ray radiated or emitted from the AR device 100 may be implemented for determining whether the ray intersects with the ground surface 702 and/or for determining the location of the intersection.

The AR device 100 may then use the location of the intersection 1106 to determine the location or placement of the virtual pit 905. In some embodiments, the AR device 100 may set or place the center of the top opening 908 of the virtual pit 905 at the location of the intersection 1106. Based on the location or the placement of the center of the top opening 908, the AR device 100 may generate the virtual pit 905 by aligning the top opening 908 with the estimated ground plane 1102 and generating the pit below the estimated ground plane 1102 based on a desired or predetermined pit size and/or shape, e.g., pit diameter, pit depth, etc. The AR device 100 may include one or more default pit sizes and/or shapes and the user may select a desired pit size and/or shape using a user interface of the AR device 100. In some embodiments, the AR device 100 may further allow the user to customize the desired pit size and/or shape. Because the center of the top opening 908 of the virtual pit 905 may be determined by projecting the virtual ray from the center of the aperture of the camera 116 in some embodiments, the generated virtual pit 905 may be positioned near or at the center of the camera image 118 in the superimposed image 182.

By utilizing an estimated ground plane 1102, the placement of the virtual pit 905 in the real world as captured by the camera 116 may be quickly determined for generating the virtual pit 905, which provides a depth reference of the underground assets for the user in the field in real time, which may not be obtained in the field by many conventional technologies.

Figure 12:
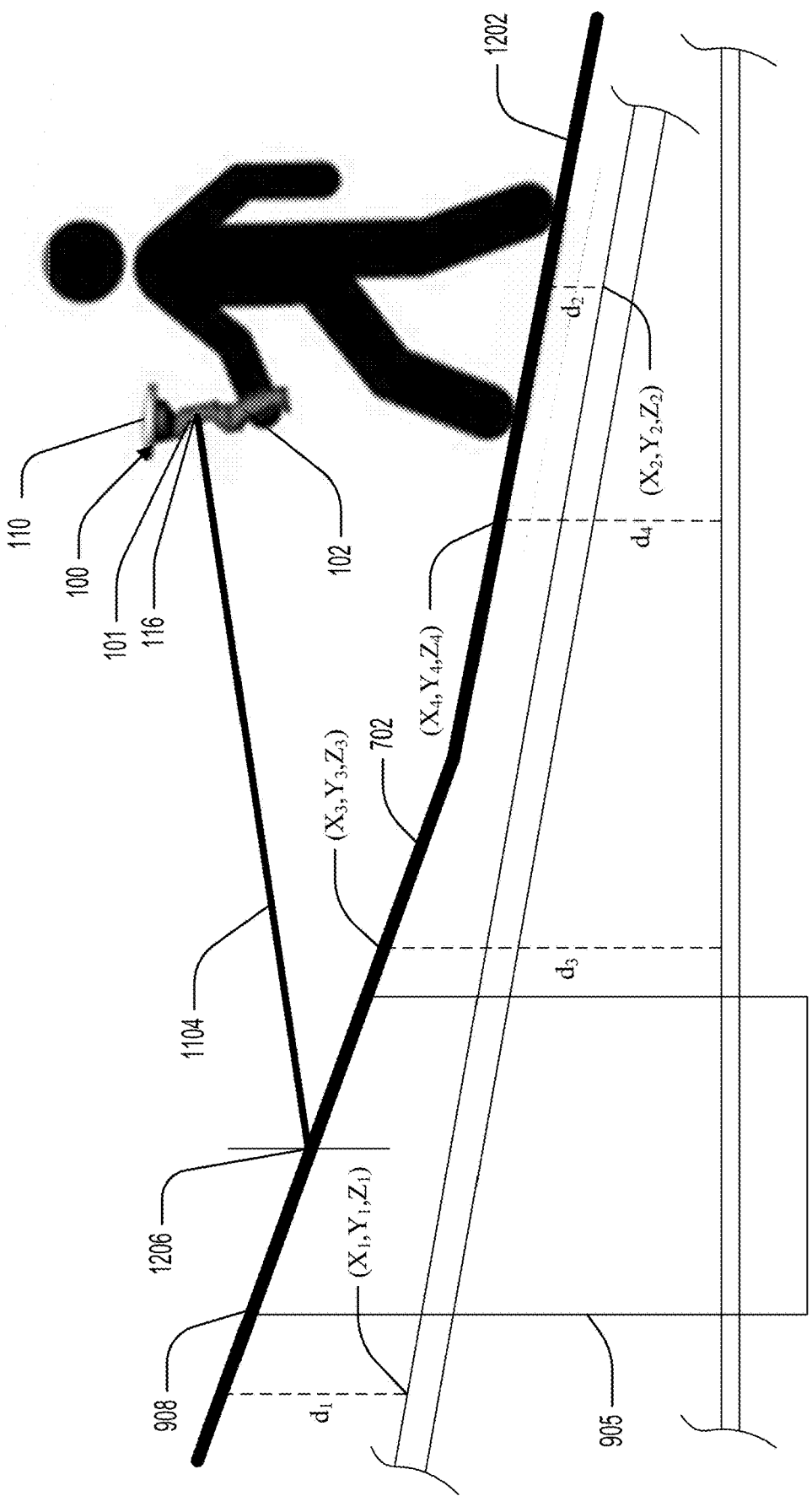
FIG. 12 illustrates another method for determining a placement or position of a virtual pit with respect to the real world, according to some embodiments of the present invention.

FIG. 12 illustrates another method for determining the placement or position of the virtual pit 905 with respect to the real world, according to some embodiments of the present invention. As mentioned above, each underground asset may be associated with asset data or asset attributes. The asset data may include depth information of the underground asset indicating the distance between the ground surface 902 and the underground asset, such as $d_1$, $d_2$, $d_3$, and $d_4$ shown in FIG. 12. The asset data may further include location information of the underground asset in the form of, e.g., geospatial coordinates, similar to the position coordinates of the GNSS receiver 110, the camera 116, the EDM device 146, etc., as discussed above. In some embodiments, the location information of the underground asset may be or include underground location information of the underground asset, such as $(X_1, Y_1, Z_1)$ and $(X_2, Y_2, Z_2)$ shown in FIG. 12. In some embodiments, the location information of the underground asset may be or include surface location information of the underground asset, which represents the location of the portion of the ground surface 902 directly above the underground asset, such as $(X_3, Y_3, Z_3)$ and $(X_4, Y_4, Z_4)$ shown in FIG. 12. Although only two data points are shown in FIG. 12 for each underground asset, the asset data may include more than two data points. Depending on the data available, the AR device 100 may extract directly or derive from the asset data the location of the ground surface 902 directly above the underground asset.

The extracted or derived information may correspond to a line or a strip on the ground surface 902 along the extension of the underground asset. The line or strip may essentially correspond to a surface projection of the underground asset onto the ground surface 902. The AR device 100 may then create a collision plane 1202 by increasing the width of the line or strip by a predetermined distance from either side of the line or strip along the ground surface 902. The width of the collision plane 1202, e.g., twice the predetermined distance, may generally be wider than the width of the underground asset so as to facilitate a subsequent ray-check operation for determining the placement of the virtual pit 905. In some embodiments, the width of the collision plane may correspond to a typical road width and may be greater than or about 1 foot, greater than or about 3 feet, greater than or about 5 feet, greater than or about 10 feet, greater than or about 25 feet, greater than or about 50 feet, greater than or about 75 feet, greater than or about 100 feet, or greater in various embodiments. In some embodiments, the AR device 100 may be configured to receive a user input specifying a desired width of the collision plane.

The AR device 100 may create a collision plane 1202 for each underground asset based on the asset data associated therewith. The created one or more collision planes 1202 may overlap with each other. Once the one or more collision planes 1202 are created, the AR device 100 may perform a ray-check operation similar to that discussed above. For example, from the location of the camera 116, the AR device 100 may project a virtual ray 1104 along the direction in which the camera 116 is pointed, and determine the location of the intersection 1206 between the virtual ray 1104 and the one or more created collision planes 1202. The AR device 100 may then set the intersection 1206 as the center of the top opening 908 of the virtual pit 905, and generate a virtual pit 905 accordingly.

The collision planes 1202 created using the method illustrated in FIG. 12 may substantially follow the ground surface 902 even when the ground surface 902 may include uneven terrains. This is because even though the underground asset may extend in a substantially linear manner within certain range, the undulation of the ground surface 902 may be reflected by the varying depth of the underground asset. Thus, by creating the collision planes 1202 using the depth information of the underground asset, the created collision planes 1202 take into account the undulation of the ground surface 902 and thus follow the undulating ground surface 902. Consequently, the center of the top opening 908 of the virtual pit 905 would also be located or placed on the ground surface 902.

In some embodiments, the top opening 908 may be maintained horizontal for ease of processing. In some embodiments, the AR device 100 may drape or draw the top opening 908 of the virtual pit 905 on the collision planes 1202 such that the top opening 908 of the virtual pit 905 may be oriented at an angle to align with the collision planes 1202 and the ground surface 902, although the AR device 100 may still orient the virtual pit 905 in an upright position, such as shown in FIG. 12 so as to provide the correct depth reference of the underground asset to the user. In some embodiments, the AR device 100 may calculate the slope or grade of the ground surface 902 based on the depth variation of the underground asset and orient or angle the top opening 908 of the virtual pit 905 accordingly to align with the ground surface 902.

Figure 13:
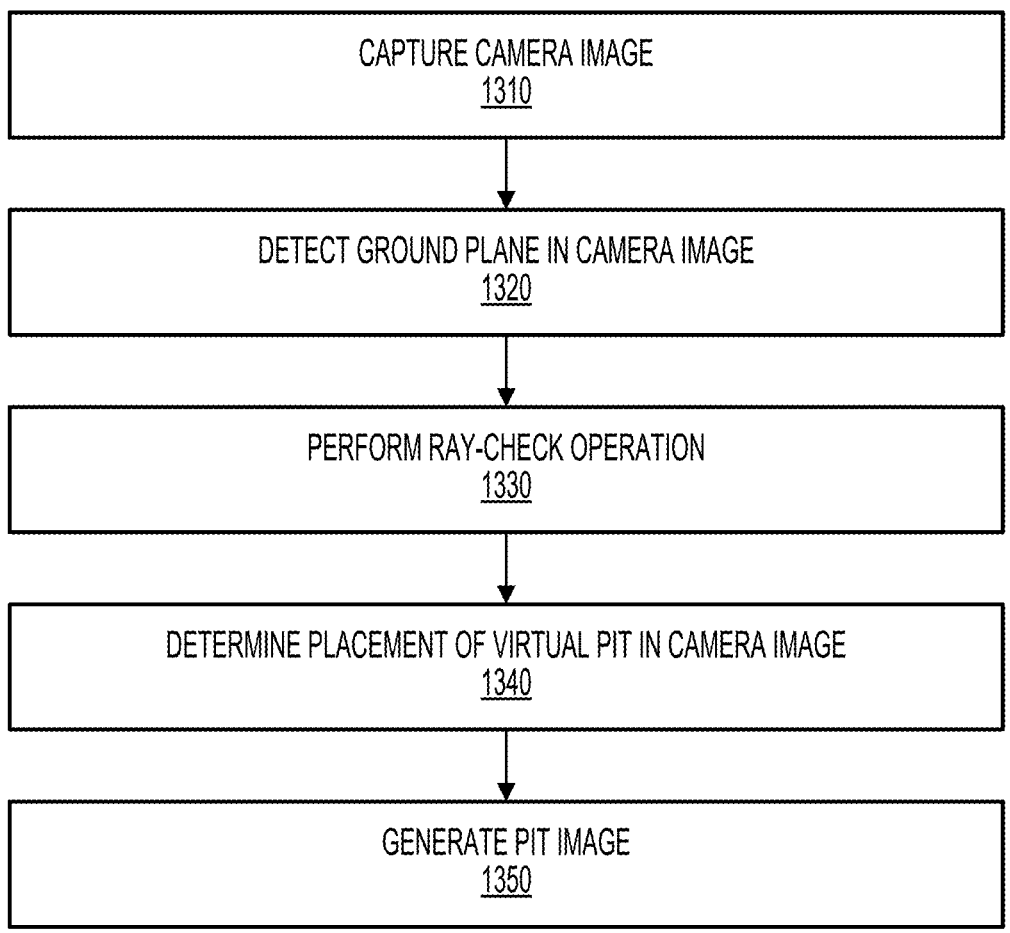
FIG. 13 illustrates operations of another method for determining a placement or position of a virtual pit with respect to the real world, according to some embodiments of the present invention.

FIG. 13 illustrates operations of another method 1300 for determining the placement or position of the virtual pit 905 with respect to the real world, according to some embodiments of the present invention.

At block 1310, a camera image 118 may be captured by the camera 116 of the AR device 100. Although this operation of capturing the camera image 118 at block 1310 may be the same operation of capturing the camera image 118 discussed above with reference method 1000, this operation is discussed here again to provide context for purpose of discussion. Two separate operations of capturing the camera image 118 may not be required in some embodiments.

At block 1320, the AR device 100 may detect or recognize a ground plane in the camera image 118. In some embodiments, the AR device 100, such as the camera component 101 of the AR device 100, may be equipped with image analysis functionalities which may recognize or detect planes in the captured camera image 118. In some embodiments, the AR device 100 may be configured to detect planes by recognizing outlines of objects captured by the camera image 118. Based on the shape of the outline, the AR device 100 may determine planes surrounded by certain outlines to be candidate planes for placing the virtual pit 905. The AR device 100 may narrow down the candidate planes by determining the orientation of the outlines in the camera image 118. For example, an upright or close to upright orientation of the outline may indicate the surrounded plane may have an upright or close to upright orientation and thus may not correspond to the ground surface 902 for placement of the virtual pit 905. The AR device 100 may also narrow down the candidate planes by determining the relative height of the candidate planes. For example, the AR device 100 may determine the lowest plane to correspond to the ground surface 902 for placement of the virtual pit 905.

In some embodiments, the AR device 100 may be configured to detect planes by recognizing the continuity or similarity of features in the camera image 118. During operation, the user may point the camera 116 at the ground. Thus, the center pixel of the camera image 118 corresponds to a point on the ground surface 902. The AR device 100, or more specifically, the camera component 101 of the AR device 100, may compare and/or analyze adjacent or surrounding pixels with the center pixel to determine whether the surrounding pixels may also correspond to points on the ground surface 902. The AR device 100 may then identify the pixels corresponding to points on the ground surface 902 to be the ground plane. In other words, the AR device 100 may determine the ground plane based on the similarity between adjacent pixels in the camera image 118.

The embodiments of recognizing outlines of objects and/or recognizing continuity or similarity of features in the camera image 118 are described herein for illustration purpose only and are not intended to be limiting. As would be appreciated by one skilled in the art, various other image analysis techniques for recognizing relatively planar surfaces in the captured camera image 118 and/or the orientations of the planar surfaces may be implemented. In some embodiments, ready-made augmented/mixed reality systems that determine or calculate planes, such as ARCore, ARKit, or other augmented/mixed reality systems, may be utilized.

After the AR device 100 determines or recognizes ground plane for placement of the virtual pit 905, at block 1330, the AR device 100 may perform a ray-check operation similar to that discussed above. For example, from the location of the camera 116, the AR device 100 may project a virtual ray 1104 along the direction in which the camera 116 is pointed, and determine the location of the intersection between the virtual ray 1104 and the recognized ground plane at block 1340. The AR device 100 may then set the intersection as the center of the top opening 908 of the virtual pit 905, and generate the virtual pit 905 accordingly at block 1350.

Depending on the image analysis techniques utilized, the AR device 100 may detect non-planar or undulating ground planes and place the virtual pit 905 in the recognized ground plane in accordance with the undulation or slope of the ground plane. For example, the AR device 100 may orient the top opening 908 of the virtual pit 905 at an angle corresponding to the undulation or slope of the recognized ground plane such that the top opening 908 or the top rim of the virtual pit 905 may substantially follow or align with the recognized ground plane.

In some embodiments, the AR device 100 may further determine the scale of the camera image 118 such that the AR device 100 may generate the virtual pit 905 in accordance with the scale. For example, a distance between the intersection obtained during the ray-check operation and the AR device 100 may be measured by the EDM device 146. The AR device 100 may determine the scale of the camera image 118 based on the measured distance and the orientation of the camera 116. Based on the determined scale, the AR device 100 may align the virtual pit 905 to the real world and display the virtual pit 905 at the correct size relative to the real world objects in the camera image 118.

Figure 14:
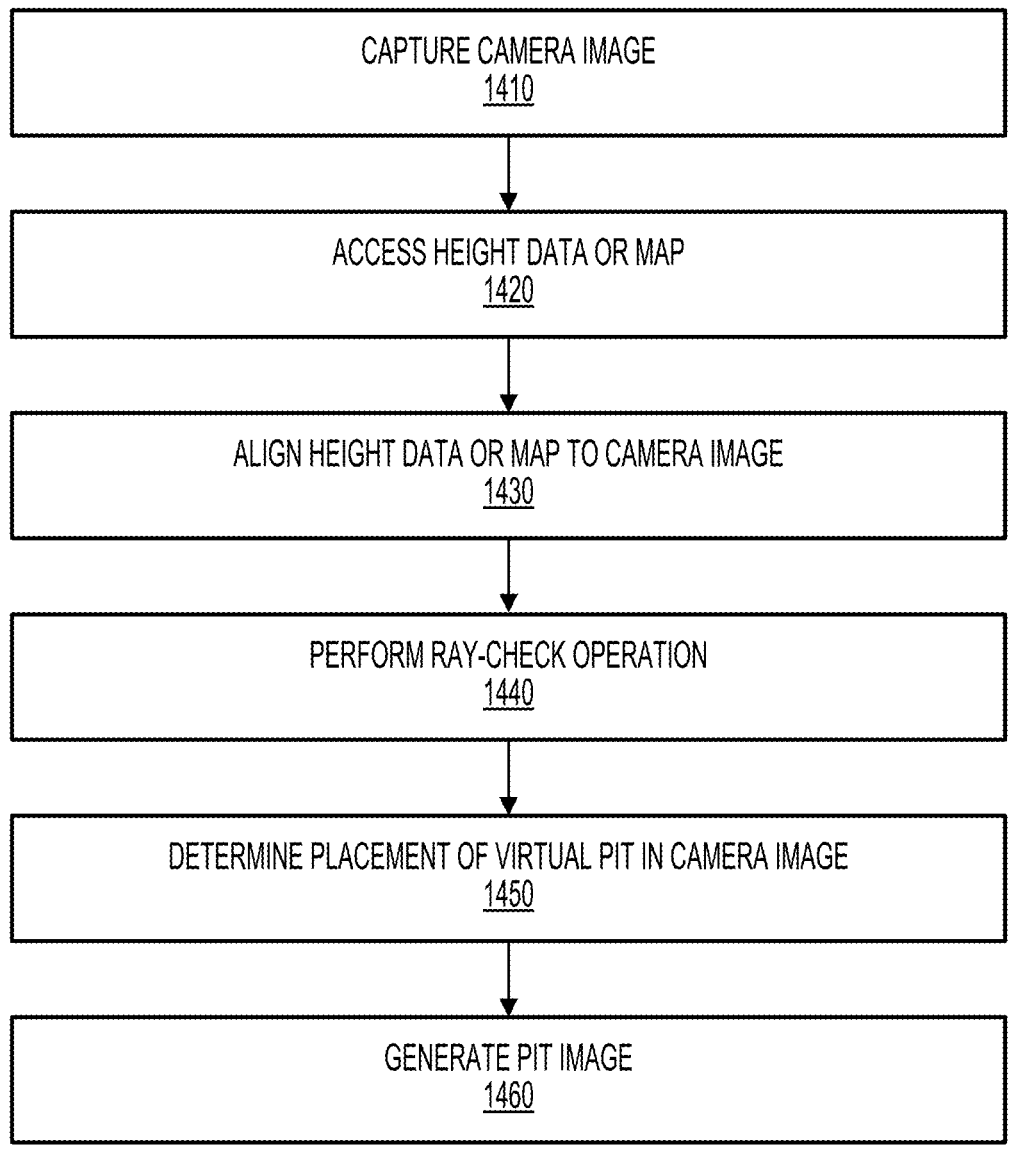
FIG. 14 illustrates operations of another method for determining a placement or position of a virtual pit with respect to the real world, according to some embodiments of the present invention.

FIG. 14 illustrates operations of another method 1400 for determining the placement or position of the virtual pit 905 with respect to the real world, according to some embodiments of the present invention.

In some embodiments, a height map or height data of the area of interest, e.g., a construction site in which the pit view 152 may be generated, may be available. The height data or map may be stored in the memory of the AR device 100 before the AR device 100 is brought to the site or may be available for download to the AR device 100 on the construction site. Alternatively, the height data or map may be stored in a memory device that may be connected to the AR device 100 device via any suitable data communication interface. The height data or map may be indicative of the elevation or topography of the surface features of the area, in addition to the location information of the area. In some embodiments, the height data or map may be in a grid format, a mesh format, a contour format, or any suitable format. In some embodiments, the height data or map may be in an image format with each pixel of the image storing elevation or height information of a corresponding location of the area.

At block 1410, a camera image 118 may be captured by the camera 116 of the AR device 100. This operation of capturing the camera image 118 at block 1410 may be the same operation of capturing the camera image 118 discussed above with reference method 1000, and is described here again to provide context. Two separate operations of capturing the camera image 118 may not be required.

At block 1420, the AR device 100 may access the height data or map. At block 1430, the height data or map may be aligned with or draped over real world objects, including the ground surface 902, in the camera image 118. In some embodiments, the height data or map may be aligned with or draped over the camera image 118 based on the location of the area and the position and/or orientation of the camera 116 of the AR device 100. The height map may be visible or may not be visible to the user.

At block 1440, the AR device 100 may perform a ray-check operation similar to that discussed above. For example, from the location of the camera 116, the AR device 100 may project a virtual ray 1104 along the direction in which the camera 116 is pointed, and determine the location of the intersection between the virtual ray 1104 and the aligned height data or map at block 1450. The AR device 100 may then set the intersection as the center of the top opening 908 of the virtual pit 905, and generate the virtual pit 905 accordingly at block 1460. The AR device 100 may further orient the top opening 908 of the virtual pit 905 at an angle corresponding to the grade or slope of the ground surface 902 based on the height or elevation information included in the height data or map such that the top rim of the virtual pit 905 substantially follows or aligns with the ground surface 902.

Figure 15:
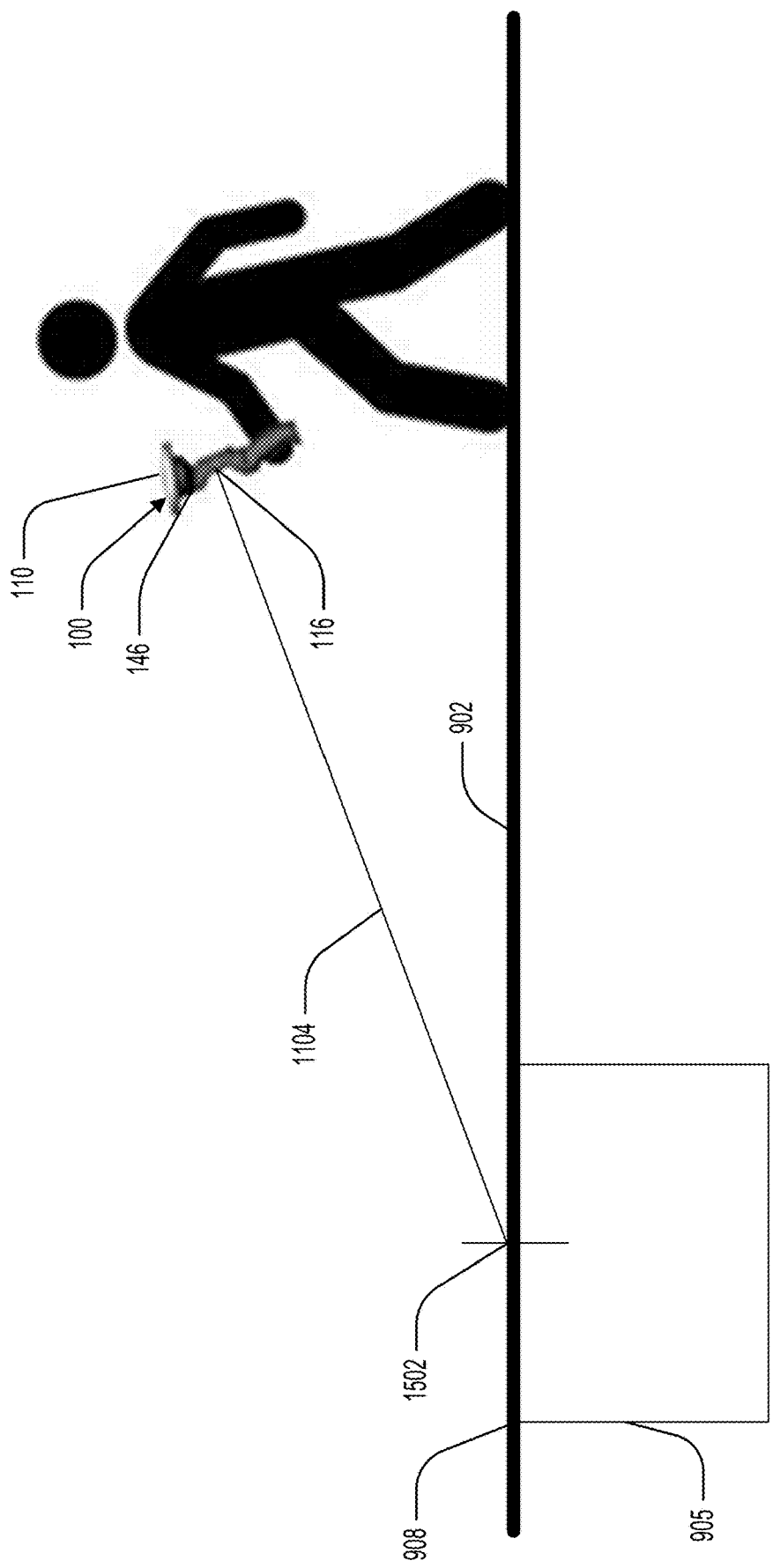
FIG. 15 illustrates another method for determining a placement or position of a virtual pit with respect to the real world, according to some embodiments of the present invention.

FIG. 15 illustrates another method for determining the placement or position of the virtual pit 905 with respect to the real world, according to some embodiments of the present invention.

In some embodiments, the EDM device 146 may be used to provide a position on the ground surface 902 for placement of the virtual pit 905. Specifically, as the user points the camera 116 at a point of interest 1502 at which the user would like the pit view 152 to be displayed, the position of the point of interest 1502 may be determined using the EDM device 146. The EDM device 146 may measure the distance between the point of interest 1502 and the EDM device 146. Based on measured distance, the orientation of the EDM device 146, and the position of the EDM device 146, the position of the point of interest 1502 may be determined. The position of the EDM device 146 may be determined based on the position of the GNSS receiver 110 and the offset vector indicating the positional relationship between the EDM device 146 and the GNSS receiver 110, or may be determined based on the position of the camera 116 and the offset vector indicating the positional relationship between the EDM device 146 and the camera 116. The EDM device 146 and the camera 116 may have a common orientation which may be determined using tilt or angle sensors as discussed above. Once the position of the point of interest 1502 is determined, the virtual pit 905 may be generated by placing the center of the top opening 908 of the virtual pit 905 at the point of interest 1502.

Figure 16:
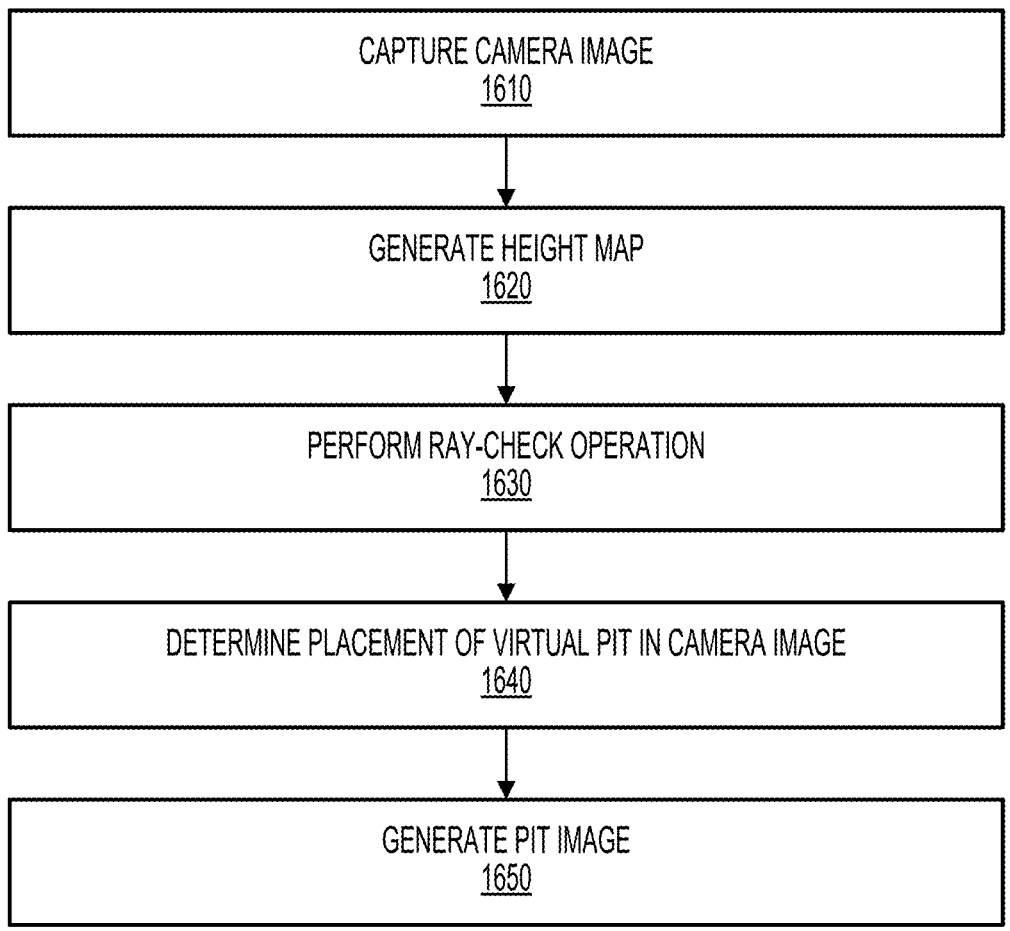
FIG. 16 illustrates operations of another method for determining a placement or position of a virtual pit with respect to the real world, according to some embodiments of the present invention.

FIG. 16 illustrates operations of another method 1600 for determining the placement or position of the virtual pit 905 with respect to the real world, according to some embodiments of the present invention. Method 1600 of FIG. 16 differs from method 1400 of FIG. 14 in that height data or a height map may be generated using the EDM device 146.

Method 1400 may begin by capturing a camera image 118 at block 1410. Again, this operation of capturing the camera image 118 at block 1410 may be the same operation of capturing the camera image 118 discussed above with reference method 1000, and is described to provide context.

At block 1420, the height data or map may be generated using the EDM device 146. Specifically, in some embodiments, the EDM device 146 may be configured to take distance measurements of multiple points on the ground surface 902 within an area of interest. For example, the EDM device 146 may be an emitter, such as a laser or electromagnetic signal emitter, configured to scan the ground surface 902 in an area of interest within a short time frame to obtain distance measurements of multiple points in the area of interest. Alternatively, the EDM device 146 may include multiple emitters for taking multiple measurements in multiple directions. The AR device 100 may be configured to determine the position and height or elevation information of the points based on the position and orientation of the EDM device 146 and the measured distances, and to generate height data or map of the area of interest.

At block 1430, the AR device 100 may then perform a ray-check operation similar to that discussed above. For example, from the location of the camera 116, the AR device 100 may project a virtual ray 1104 along the direction in which the camera 116 is pointed, and determine the location of the intersection between the virtual ray 1104 and the generated height data or map. At block 1440, the AR device 100 may set the intersection as the center of the top opening 908 of the virtual pit 905, and generate the virtual pit 905 accordingly at block 1450. The AR device 100 may further orient the top opening 908 of the virtual pit 905 at an angle corresponding to the grade or slope of the ground surface 902 based on the height or elevation information in the generated height data or map such that the top rim of the virtual pit 905 substantially follows or aligns with the ground surface 902.

In some embodiments, the AR device 100 device may be further configured to distinguish non-ground surfaces that may be detected by the EDM device 146. For example, the laser or electromagnetic signals from the EDM device 146 may reach and be reflected off of surfaces of non-ground surfaces, such as moving or parked vehicles, trees, people, or other real world objects. Further processing of the data collected by the EDM device 146 may be performed such that the generated height data or map, as well as the virtual pit 905 subsequently produced therefrom, may properly follow the ground surface 902, as opposed to any non-ground surfaces.

In some embodiments, the AR device 100 may be configured to analyze the distance measurements taken by the EDM device 146 and/or the height data or map generated therefrom to determine if any detected surfaces may be non-ground surfaces. For example, the AR device 100 may be configured to analyze the continuity of the distance and/or height data across the area of interest and determine if any surfaces are likely non-ground surfaces. In some embodiments, the AR device 100 may be configured to determine whether the distance or height data for a portion of an image may differ from the distance or height data of adjacent portions by more than a threshold value due, for example, to the presence of non-ground objects. If the AR device 100 determines a change beyond the threshold value, the AR device 100 may determine that the portion in the area of interest may correspond to a non-ground surface. The AR device 100 may then replace the distance or height data corresponding the non-ground surface with distance or height data calculated based on the distance or height data of the adjacent portions.

In some embodiments, the AR device 100 may be configured to compare the distance measurements and/or the height data obtained at different points of time, and determine whether a change in the elevation or height has occurred due, for example, to a moving object coming into and/or leaving the area of interest. If so, the AR device 100 device may be configured to discard the data collected during the presence of the moving objects.

In some embodiments, as an alternative to or in addition to determining the placement or location of the virtual pit 905 in the captured camera image 118 by the AR device 100, the AR device 100 may be configured to allow the user to determine the placement of the virtual pit 905 in the captured camera image 118. For example, the user may provide an input to the AR device 100 to identify the desired location of the virtual pit 905 by, for example, touching the display 156 in the case of a touch-screen display, clicking on the screen using an input device, or inputting the location of the virtual pit 905 using a keyboard or such. The AR device 100 may also be configured to allow the user to move or drag the virtual pit 905 to any location the user may desire on the display 156.

Figure 17:
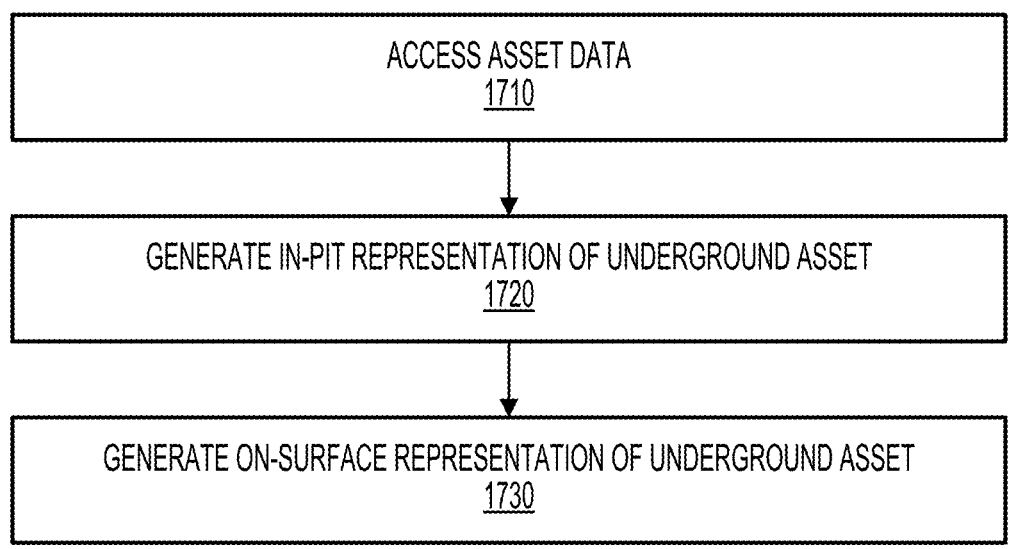
FIG. 17 illustrates operations of a method for generating virtual representations of underground assets, according to some embodiments of the present invention.

FIG. 17 illustrates operations of a method 1700 for generating the virtual representations 906 of the underground assets, according to some embodiments of the present invention. As mentioned above, the asset data of the underground assets may include depth information of the underground asset indicating the distance between the ground surface 902 and the underground asset. Depending on the data format, some asset data may include location information of the underground asset, while some asset data may include location information of the ground surface 902 directly above the underground asset. Depending on the data available, the AR device 100 may extract directly or derive from the asset data the location information of the underground asset and/or the location information of the ground surface 902 directly above the underground asset.

At block 1710, the AR device 100 may access the asset data, which may include asset attributes of the underground asset, such as size (e.g., diameter, length, etc.), depth, type, etc. Based on the attributes of the underground asses, the AR device 100 may generate the various virtual representations 906 of the underground assets at block 1720. For example, the AR device 100 may generate an underground representation of an underground asset for displaying in the virtual pit 905 at the correct depth based on the location (e.g., underground location), depth, size, type, and/or other attributes of the underground asset. The underground representation may be or include a 3D virtual representation of the underground asset to illustrate the shape and size of the underground asset, similar to the 3D virtual representation 910 of the underground asset shown in FIG. 9. Different types of the underground assets may be indicated using different colors.

In some embodiments, the AR device 100 may generate an underground representation of the underground asset within a predetermined range from the center of the virtual pit 905, and the predetermined range may be greater than the virtual pit 905 to cover the entire area of interest. The AR device 100 may then determine the relevant portion of the underground representation to display based on the location and size (e.g., diameter) of the virtual pit 905 as will be discussed in more detail below. In some embodiments, the AR device 100 may only generate an underground representation of the portion of the underground asset within the virtual pit 905 at one location, and may generate another underground representation as the virtual pit 905 is moved to a different location.

At block 1730, the AR device 100 may generate an on-surface representation of an underground asset following the contour of the ground surface 902 based on the location (e.g., ground surface location), size, type, and/or other attributes of the underground asset. The on-surface representation may be or include a 2D virtual representation of the underground asset, such as an extruded plane similar to the 2D virtual representation 912 of the underground asset shown in FIG. 9. The underground representation and the on-surface representation of a common underground asset may be displayed using similar colors, but one of the representations, such as the on-surface representation, may be semi-transparent to indicate the underground nature of the displayed asset.

FIG. 18A-18E illustrate a method for generating a pit view 152, according to some embodiments of the present invention. The pit view 152 may be generated based on the location or placement of the virtual pit 905 and the virtual representations 906 of the underground assets discussed above.

Figure 18A:
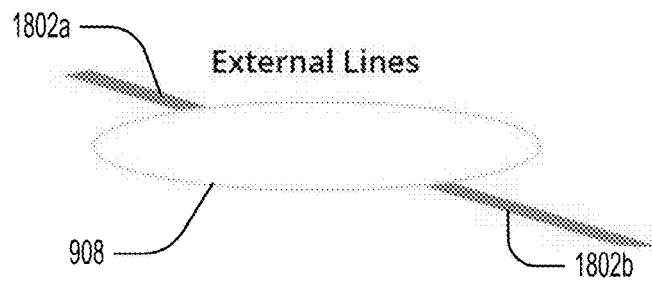
FIG. 18A-18E illustrate a method for generating a pit view, according to some embodiments of the present invention.

With reference to FIG. 18A, based on the placement of the virtual pit 905 as discussed above and the size of the virtual pit 905, only portions 1802a, 1802b of the on-surface representation outside the virtual pit 905 may be rendered in the pit view 152. The AR device 100 may store a default size for the virtual pit 905. Alternatively, the user may provide input to the AR device 100 specifying a desired pit size, including the pit width/diameter, pit depth, pit shape, etc. Based on the size of the virtual pit 905, the AR device 100 may apply a shader, e.g., a GPU Clip based shader, to the on-surface representation of the underground asset such that any pixels of the on-surface representation that may be within the virtual pit 905, e.g., within the radius of the center of the virtual pit 905, may not be displayed.

Figure 18B:
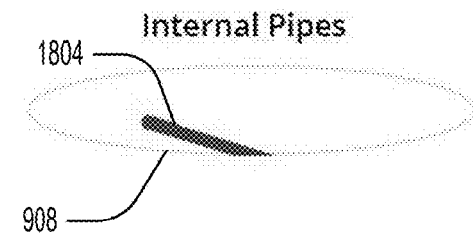

With reference to FIG. 18B, based on the placement and the size of the virtual pit 905, only the portion 1804 of the underground representation inside the virtual pit 905 may be rendered in the pit view 152. For example, another shader, which may be an inverter of the shader for drawing the portions 1802a, 1802b of the on-surface representation, may be applied to the underground representation such that any pixels of the underground representation that may be outside the virtual pit 905, e.g., outside the radius of the virtual pit 905, may not be displayed.

Figure 18C:
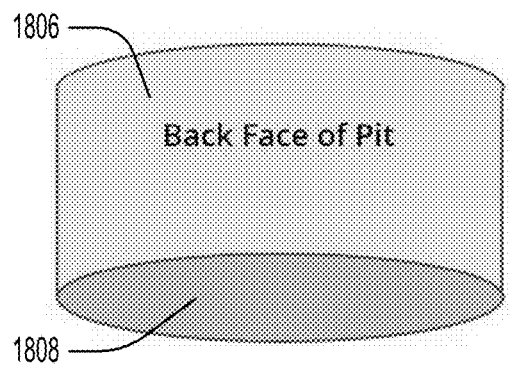

With reference to FIG. 18C, the pit wall 1806 and the pit bottom 1808 of the virtual pit 905 may be drawn based on the location of the virtual pit 905 and the size of the virtual pit 905. In some embodiments, only the back portion or back face of the pit wall 1806, i.e., the portion of the pit wall 1806 facing the user may be drawn. Although not shown in FIG. 18C, the pit wall 1806 may further include depth indicators such as markings along the pit wall 1806 to provide user an indication of the depth of the underground assets inside the virtual pit 905.

Figure 18D:
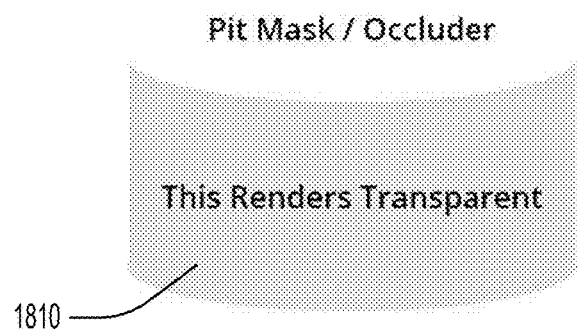

With reference to FIG. 18D, a pit mask or pit occluder 1810 may be generated based on the location of the virtual pit 905 and the size of the virtual pit 905. The pit mask 1810 may correspond to the front portion of the pit wall 1806 opposite to the back portion of the pit wall 1806. The pit mask 1810 may not be displayed in the subsequently generated superimposed image 182. The pit mask 1810 may be configured to render transparent the portion of the pit wall 1806, the portion of the pit bottom 1808, and any objects inside the virtual pit 905 that may be behind or blocked by the front portion of the pit wall 1806 from the user's point view.

Figure 18E:
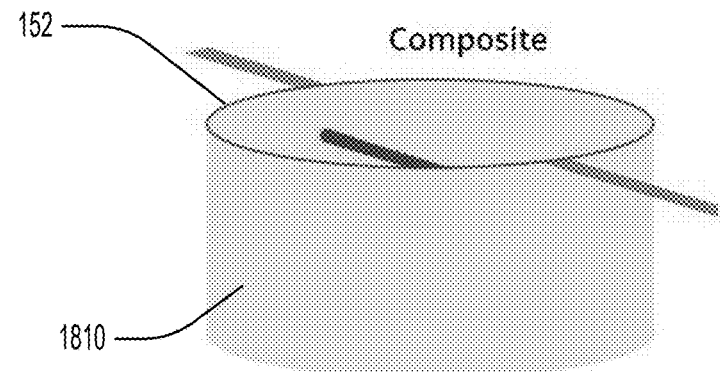

With reference to FIG. 18E, the portions 1802a, 1802b of the on-surface representation of the underground asset, the portion 1804 of the underground representation of the underground asset, the pit wall 1806 and the pit bottom 1808 of the virtual pit 905, and the pit mask 1810 may be combined to produce the pit view 152.

It should be noted that when drawing the portions of the on-surface and underground representations of the underground asset and the virtual pit 905, the viewing direction of the user may also be taken into account, as reflected by the oval shape of the top opening 908 of the virtual pit 905. The viewing direction of the user may correspond to the virtual ray 1104 projected from the center of the camera 116 and perpendicular to the orientation of the camera 116. As the viewing direction of the user and/or the orientation of the camera 116 changes, the pit view 152 may also change.

Although not shown in FIG. 18E, in some embodiments, the pit view 152 may further include projections 911 (shown in FIG. 9) of the underground asset onto the pit wall 1806 and/or the pit bottom 1808 of the virtual pit 905. The projections 911 may provide a visual connection between the portion 1804 of the underground representation and the portions 1802a, 1802b of the on-surface representation of the same underground asset, which can be helpful for the user when multiple underground assets may be disposed in close proximity.

Once the pit view 152 is generated, the AR device 100 may superimpose the pit view 152 onto the camera image 118 to generated the superimposed image 182 for display to the user. In some embodiments, when generating the superimposed image 182, the camera component 101 may return a perspective transformation. Based on the perspective of the camera 116 and the size and position of the virtual pit 705, the pit view 152 may be transformed and rendered to match the perspective of the camera 116, and may be positioned and aligned to the real world captured by the camera image 118 to generate the superimposed image 182. In some embodiments, when generating the superimposed image 182, the distance between the location of the virtual pit 905 and the AR device 100 (as measured by, e.g., the EDM device 146) and the orientation of the camera 116 (as measured by, e.g., the tilt or angle sensors) may be utilized to determine the scale of the captured camera image 118. Based on the determined scale, the AR device 100 may overlay the pit view 152 onto the camera image 118 accordingly such that the virtual pit 905 and the underground asset may be aligned to the real world and the virtual pit 905 and the underground asset may be displayed at the correct size relative to the other real world objects in the camera image 118. Various other techniques for matching the sizes of the pit view 152 and the camera image 118 may be implemented.

Figure 19:
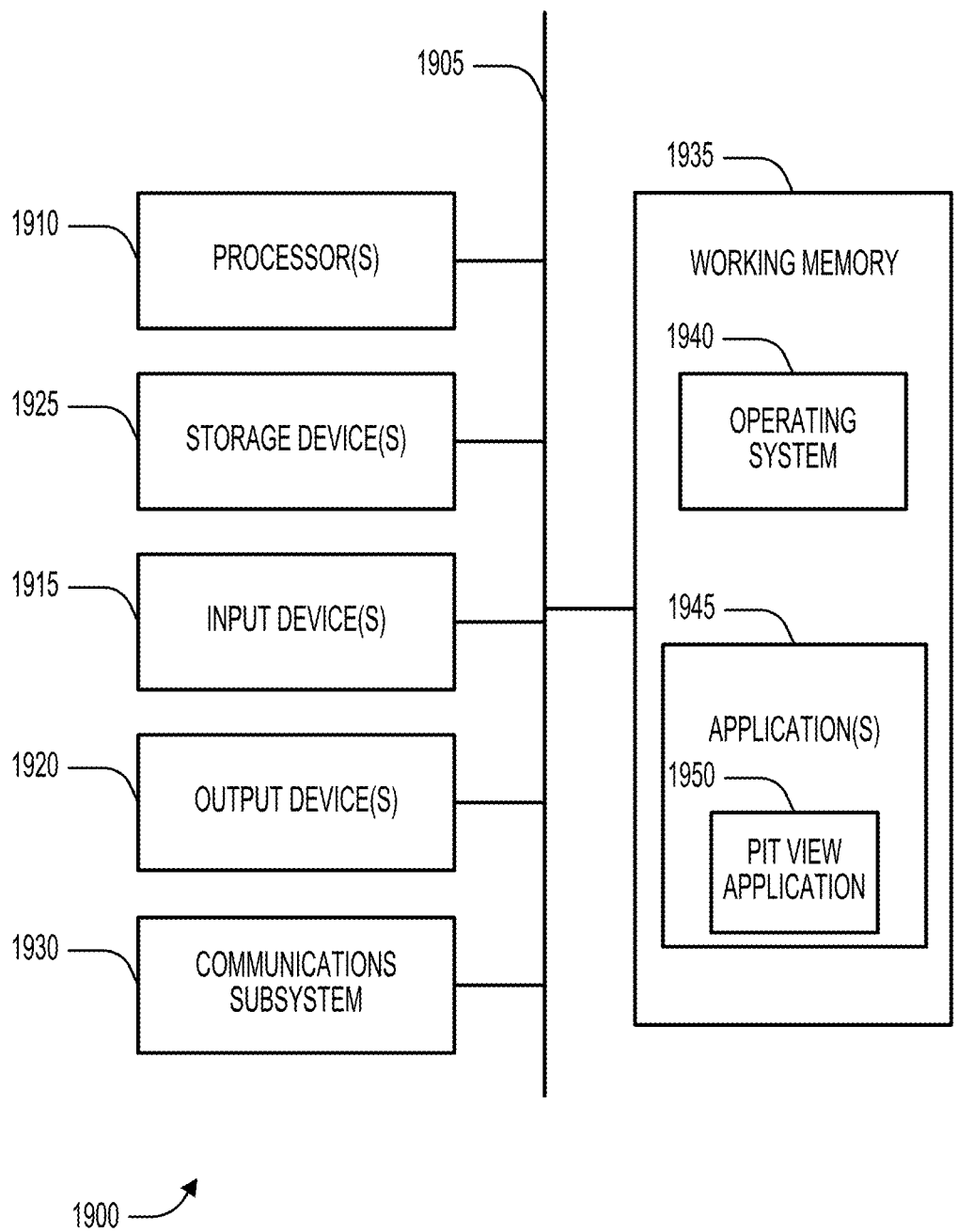
FIG. 19 illustrates a simplified computer system, according to some embodiments of the present invention.

FIG. 19 illustrates a simplified computer system 1900, according to an embodiment of the present disclosure. A computer system 1900 as illustrated in FIG. 19 may be incorporated into devices such as a portable electronic device, mobile phone, or other device, including the AR device 100 as described herein. FIG. 19 provides a schematic illustration of one embodiment of a computer system 1900 that can perform some or all of the steps or operations of the methods provided by various embodiments, such as the various operations for determining the placement of the virtual pit 905, for generating the virtual representations 906 of the underground assets, for generating the pit view 152, for generating the superimposed image 182, etc. It should be noted that FIG. 19 is meant only to provide an exemplary illustration of various components, any or all of which may be utilized as appropriate. FIG. 19, therefore, broadly illustrates how individual system elements may be implemented in a relatively separated or more integrated manner.

The computer system 1900 is shown comprising hardware elements that can be electrically coupled via a bus 1905, or may otherwise be in communication, as appropriate. The hardware elements may include one or more processors 1910, including without limitation one or more general-purpose processors and/or one or more special-purpose processors such as digital signal processing chips, graphics acceleration processors, and/or the like; one or more input devices 1915, which can include, without limitation a mouse, a keyboard, a camera, and/or the like; and one or more output devices 1920, which can include, without limitation a display device, a printer, and/or the like.

The computer system 1900 may further include and/or be in communication with one or more non-transitory storage devices 1925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1900 might also include a communications subsystem 1930, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1930 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1930. In other embodiments, a portable electronic device, e.g. the first electronic device, may be incorporated into the computer system 1900, e.g., an electronic device as an input device 1915. In some embodiments, the computer system 1900 will further comprise a working memory 1935, which can include a RAM or ROM device, as described above.

The computer system 1900 also can include software elements, shown as being currently located within the working memory 1935, including an operating system 1940, device drivers, executable libraries, and/or other code, such as one or more application programs 1945, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods. For example, in some embodiments, the computer system 1900 may include a pit view application 1950 in the form of, e.g., executable programs and/or code, for implementing one or more of the methods or operations described herein, such as the methods and/or operations for determining the placement of the virtual pit 905, for generating the virtual representations 906 of the underground assets, for generating the pit view 152, for generating the superimposed image 182, etc.

A set of these instructions and/or code may be stored on a non-transitory computer-readable storage medium, such as the storage device(s) 1925 described above. In some cases, the storage medium might be incorporated within a computer system, such as computer system 1900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1900 and/or might take the form of source and/or installable code, which, upon compilation and/or installation on the computer system 1900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as the computer system 1900 to perform methods in accordance with various embodiments of the technology. According to a set of embodiments, some or all of the procedures of such methods are performed by the computer system 1900 in response to processor 1910 executing one or more sequences of one or more instructions, which might be incorporated into the operating system 1940 and/or other code, such as an application program 1945, contained in the working memory 1935. Such instructions may be read into the working memory 1935 from another computer-readable medium, such as one or more of the storage device(s) 1925. Merely by way of example, execution of the sequences of instructions contained in the working memory 1935 might cause the processor(s) 1910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1900, various computer-readable media might be involved in providing instructions/code to processor(s) 1910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1925. Volatile media include, without limitation, dynamic memory, such as the working memory 1935.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1900.

The communications subsystem 1930 and/or components thereof generally will receive signals, and the bus 1905 then might carry the signals and/or the data, instructions, etc. carried by the signals to the working memory 1935, from which the processor(s) 1910 retrieves and executes the instructions. The instructions received by the working memory 1935 may optionally be stored on a non-transitory storage device 1925 either before or after execution by the processor(s) 1910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for displaying underground assets using an electronic device, the method comprising:
   capturing a camera image of a ground having a ground surface;
   determining a placement of a virtual pit in the camera image;
   generating a pit view comprising the virtual pit and a virtual representation of an underground asset based on asset data associated with the underground asset, the virtual pit comprising at least one depth marker along a wall of the virtual pit; and
   generating a superimposed image comprising the camera image and the pit view such that:
   a top opening of the virtual pit aligns with the ground surface in the camera image; and
   a portion of the virtual representation of the underground asset is shown inside the virtual pit and below the top opening of the virtual pit such that a distance between the top opening and the portion of the virtual representation of the underground asset inside the virtual pit provides a visual indication of a depth of the underground asset relative to the ground surface.

2. The method of claim 1, wherein determining the placement of the virtual pit comprises:
determining a ground plane;
determining a location of an intersection of a virtual ray and the ground plane, wherein the virtual ray is projected from a center of a camera component configured to capture the camera image such that the intersection of the virtual ray and the ground plane is near a center of the camera image; and
generating the virtual pit based on the location of the intersection.

3. The method of claim 2, wherein:
determining the ground plane comprises determining, based on a geospatial position of the electronic device, an estimated ground plane at a predetermined distance below the electronic device; and
determining the location of the intersection of the virtual ray and the ground plane comprises determining a location of an intersection of the virtual ray and the estimated ground plane.

4. The method of claim 2, wherein:
the asset data comprises attributes of one or more underground assets;
determining the ground plane comprises determining one or more collision planes, wherein each of the one or more collision planes is determined based on the attributes of the one or more underground assets such that each of the one or more collision planes overlays the ground surface and extends along an extension of a corresponding underground asset; and
determining the location of the intersection of the virtual ray and the ground plane comprises determining a location of an intersection of the virtual ray and at least one of the one or more collision planes.

5. The method of claim 2, wherein:
determining the ground plane comprises recognizing the ground plane based on the captured camera image.

6. The method of claim 1, wherein determining the placement of the virtual pit comprises:
accessing a height map of the ground;
aligning the height map with the ground surface of the camera image;
determining a location of an intersection of a virtual ray and the height map, wherein the virtual ray is projected from a center of a camera component configured to capture the camera image such that the intersection of the virtual ray and the ground plane is near a center of the camera image; and
generating the virtual pit based on the location of the intersection.

7. The method of claim 1, wherein determining the placement of the virtual pit comprises:
determining a position of a point of interest in the camera image based on a distance to the point of interest measured by an electronic distance meter (EDM) device of the electronic device; and
generating the virtual pit at the point of interest.

8. The method of claim 1, wherein determining the placement of the virtual pit comprises:
generating a height map of the ground using an electronic distance meter (EDM) device of the electronic device;
determining a location of an intersection of a virtual ray and the height map, wherein the virtual ray is projected from a center of a camera component configured to capture the camera image such that the intersection of the virtual ray and the ground plane is near a center of the camera image; and
generating the virtual pit based on the location of the intersection.

9. The method of claim 1, wherein generating the pit view comprises:
generating a first representation of the underground asset based at least in part on one of depth information or position information of the asset data for displaying inside the virtual pit; and
generating a second representation of the underground asset based at least in part on one of the depth information or position information of the asset data for displaying at the ground surface in the superimposed image.

10. The method of claim 9, wherein generating the pit view further comprises:
determining pixels of the first representation of the underground asset that are within a predetermined radius of a center of the virtual pit for displaying in the superimposed image;
determining pixels of the second representation of the underground asset that are outside the predetermined radius of the center of the virtual pit for displaying in the superimposed image; and
generating a pit mask configured to render any virtual representation inside the virtual pit and behind the pit mask transparent.

11. An electronic device for displaying underground assets, the electronic device comprising:
a global navigation satellite system (GNSS) receiver configured to determine a geospatial position of the GNSS receiver; and
an electronic distance measuring (EDM) device configured to capture a distance to a point of interest, wherein the GNSS receiver and the EDM device are configured to be communicatively coupled to a camera via one or more processors, wherein the one or more processes are configured to perform operations comprising:
capturing a camera image, using the camera, of a ground having a ground surface;
determining a placement of a virtual pit in the camera image using at least one of the GNSS receiver and the EDM device;
generating a pit view comprising the virtual pit and a virtual representation of an underground asset based on asset data associated with the underground asset, the virtual pit comprising at least one depth marker along a wall of the virtual pit; and
generating a superimposed image comprising the camera image and the pit view such that:
a top opening of the virtual pit aligns with the ground surface in the camera image; and
a portion of the virtual representation of the underground asset is shown inside the virtual pit and below the top opening of the virtual pit such that a distance between the top opening and the portion of the virtual representation of the underground asset inside the virtual pit provides a visual indication of a depth of the underground asset relative to the ground surface.

12. The electronic device of claim 11, wherein determining the placement of the virtual pit comprises:
determining a ground plane;
determining a location of an intersection of a virtual ray and the ground plane, wherein the virtual ray is projected from a center of the camera such that the intersection of the virtual ray and the ground plane is near a center of the camera image; and generating the virtual pit based on the location of the intersection.

13. The electronic device of claim 12, wherein:

determining the ground plane comprises determining, based on the geospatial position of the GNSS receiver, an estimated ground plane at a predetermined distance below the GNSS receiver; and determining the location of the intersection of the virtual ray and the ground plane comprises determining a location of an intersection of the virtual ray and the estimated ground plane.

14. The electronic device of claim 12, wherein:

the asset data comprises attributes of one or more underground assets;

determining the ground plane comprises determining one or more collision planes, wherein each of the one or more collision planes is determined based on attributes of the one or more underground assets such that each of the one or more collision planes overlays the ground surface and extends along an extension of a corresponding underground asset; and determining the location of the intersection of the virtual ray and the ground plane comprises determining a location of an intersection of the virtual ray and at least one of the one or more collision planes.

15. The electronic device of claim 12, wherein:

determining the ground plane comprises recognizing the ground plane based on the captured camera image.

16. The electronic device of claim 11, wherein determining the placement of the virtual pit comprises:

accessing a height map of the ground;

aligning the height map with the ground surface of the camera image;

determining a location of an intersection of a virtual ray and the height map, wherein the virtual ray is projected from a center of the camera such that the intersection of the virtual ray and the ground plane is near a center of the camera image; and generating the virtual pit based on the location of the intersection.

17. The electronic device of claim 11, wherein determining the placement of the virtual pit comprises:

determining a position of a point of interest in the camera image based on a distance to the point of interest measured by the EDM device; and generating the virtual pit at the point of interest.

18. The electronic device of claim 11, wherein determining the placement of the virtual pit comprises:

generating a height map of the ground using the EDM device;

determining a location of an intersection of a virtual ray and the height map, wherein the virtual ray is projected from a center of the camera such that the intersection of the virtual ray and the ground plane is near a center of the camera image; and generating the virtual pit based on the location of the intersection.

19. The electronic device of claim 11, wherein generating the pit view comprises:

generating a first representation of the underground asset based at least in part on one of depth information or position information of the asset data for displaying inside the virtual pit; and generating a second representation of the underground asset based at least in part on one of the depth information or position information of the asset data for displaying at the ground surface in the superimposed image.

20. The electronic device of claim 19, wherein generating the pit view further comprises:

determining pixels of the first representation of the underground asset that are within a predetermined radius of a center of the virtual pit for displaying in the superimposed image;

determining pixels of the second representation of the underground asset that are outside the predetermined radius of the center of the virtual pit for displaying in the superimposed image; and generating a pit mask configured to render any virtual representation inside the virtual pit and behind the pit mask transparent.

* * * * *